(12) United States Patent
Inoue et al.

(10) Patent No.: US 8,099,418 B2
(45) Date of Patent: Jan. 17, 2012

(54) INFORMATION SEARCH SUPPORT METHOD AND INFORMATION SEARCH SUPPORT DEVICE

(75) Inventors: Tsuyoshi Inoue, Nara (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 175 days.

(21) Appl. No.: 12/517,597

(22) PCT Filed: May 14, 2008

(86) PCT No.: PCT/JP2008/001208
§ 371 (c)(1),
(2), (4) Date: Jun. 4, 2009

(87) PCT Pub. No.: WO2008/146456
PCT Pub. Date: Dec. 4, 2008

(65) Prior Publication Data
US 2010/0281036 A1    Nov. 4, 2010

(30) Foreign Application Priority Data

May 28, 2007    (JP) .................................. 2007-141103

(51) Int. Cl.
*G06F 17/30*    (2006.01)
*G06F 17/00*    (2006.01)
(52) U.S. Cl. .................. 707/748; 707/754; 707/769
(58) Field of Classification Search .................. 707/748, 707/754, 769
See application file for complete search history.

(56) References Cited

U.S. PATENT DOCUMENTS

| | | | | |
|---|---|---|---|---|
| 5,418,948 A | * | 5/1995 | Turtle | 707/700 |
| 7,139,762 B2 | * | 11/2006 | Labarge et al. | 1/1 |
| 7,730,060 B2 | * | 6/2010 | Chakrabarti et al. | 707/723 |
| 7,870,147 B2 | * | 1/2011 | Bailey et al. | 707/767 |
| 2003/0225755 A1 | | 12/2003 | Iwayama et al. | |

FOREIGN PATENT DOCUMENTS

| | | |
|---|---|---|
| JP | 2000-076282 | 3/2000 |
| JP | 2003-345810 | 12/2003 |

OTHER PUBLICATIONS

International Search Report issued Jun. 10, 2008 in the International (PCT) Application of which the present application is the U.S. National Stage.
Douglass R. Cutting et al., "Scatter/Gather: A Cluster—based Approach to Browsing Large Document Collections", In Proceedings of the SIGIR '92, Jun. 1992.
Muneo Kitajima, "Latent Semantic Analysis; LSA", Journal of Japan Society for Fuzzy Theory and Intelligent Informatics vol. 17, No. 1, Feb. 2005, p. 76 (with partial English Translation).
Kenji Kita et al., "John Kensaku Algorithm (Information Retrieval Algorithm)", Kyoritsu Shuppan Co., Ltd., Jan. 2002, pp. 65 and 66 (with partial English translation).

* cited by examiner

*Primary Examiner* — Yicun Wu
(74) *Attorney, Agent, or Firm* — Wenderoth, Lind & Ponack, L.L.P.

(57) ABSTRACT

An information search support device includes: a cluster selection history information accumulation unit which accumulates content information of each cluster and cluster selection history information indicating a cluster selected by a user; a degree of certainty calculation unit which calculates a degree of certainty indicating a degree to which a vague search target of the user has been identified, based on the cluster selection history information accumulated; a search target estimation unit which obtains a condition for estimating the search target; a search-omitted information extraction unit which extracts search-omitted information that is included in the cluster that is not selected and is estimated from the obtained condition; and a search-omitted information addition unit which adds, to the cluster selected by the user, the extracted search-omitted information, in the case where the degree of certainty is equal to or higher than a predetermined threshold.

10 Claims, 20 Drawing Sheets

FIG. 7

| Operation No. | | Cluster number | Selected /Not-selected | Number of programs | Representative word | Representative program |
|---|---|---|---|---|---|---|
| 1 | | | | | | |
| Screen display start time | 19:31:20 | 1 | Selected | 22 | Word 1, Word 2, ... | Program name 1-1, Program name 1-2 ... |
| Command name | Subdivision | 2 | Not-selected | 253 | Word 1, Word 2, ... | Program name 2-1, Program name 2-2 ... |
| Execution time | 19:32:00 | 3 | Not-selected | 316 | Word 1, Word 2, ... | Program name 3-1, Program name 3-2 ... |
| Number of target programs | 599 | 4 | Selected | 8 | Word 1, Word 2, ... | Program name 3-1, Program name 3-2 ... |

FIG. 8

| 701 Program number | 702 Program name | 703 Program content |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

| Operation No. | | Representative word | DF value | Total DF value/Amount of change |
|---|---|---|---|---|
| 1 | | Dramatic | 8 | 571/- |
| | | Tomorrow | 9 | |
| Number of target programs/Amount of change | | Earth | 16 | Average DF value/Amount of change |
| 275/1.19 | | Society/News | 131 | 57.1/- |
| | | War | 7 | |
| Number of selected clusters/Amount of change | | World | 120 | Degree of certainty |
| 2/0 | | Japan | 83 | 1.8 |
| | | Society/News | 131 | |
| | | Documentary | 22 | |
| | | Special | 44 | |

(b)

| Operation No. | | Representative word | DF value | Total DF value/Amount of change |
|---|---|---|---|---|
| 2 | | Tomorrow | 9 | 52/519 |
| | | Craftsman | 9 | |
| Number of target programs/Amount of change | | Medical services | 8 | Average DF value/Amount of change |
| 13/20.15 | | Medical treatment | 10 | 10.4/46.7 |
| Number of selected clusters/Amount of change | | Region | 16 | Degree of certainty |
| 1/1 | | | | 9.6 |

FIG. 12

| Program number | Program name | Program content |
|---|---|---|
| 46 | ... | Special topic on "'Collapse' of Medical Services in City" ▽ resignation of medical doctors in overcrowded city ▽ Conflict with city ▽ Health concern |
| 40 | ... | Special topic on Life of Family Member Saved by Unknown Doctor—Documentary on cutting-edge medical services ▽ Hands of god into blood capillary ... |

FIG. 13

| Program number | Program name | Program content |
|---|---|---|
| 482 | ... | "Special Topic on Medial Treatment using DNA" Live to be 150 years old...life extended with genes of parents▽Blow to chest |
| 281 | ... | Self-defense by patient! Do not be deceived by dishonest hospital! Discerning eye for hospital Dishonest hospital forging medial charts! Life saved because of conscientious emergency hospital! |
| 19 | ... | Return-to-life story SP(2) Thanks again Doctor saving father from intractable disease...doctor's dedication▽Rehabilitation |
| 16 | ... | Natural science documentary "Clone" ▽Internal organ transplantation abroad▽Time limit approaching to transplantation coordinator |
| 95 | ... | Coping with dilapidated hospital ward |
| 499 | ... | (1) Food for repairing cavities (2) Mystery of pollen allergy▽3-minute brain refreshing exercise |
| 62 | ... | Additives that deprive the future of children |
| 30 | ... | "Overcome Handicap...Close-up Documentary" Doable in wheelchair...Toward surgery that does not leave permanent handicap |

FIG. 17

| Operation No. 1601 | Result of search-omitted information extraction determination 1602 | Extraction vector 1603 | Distance from past extraction vector (Operation No., Distance) 1604 |
|---|---|---|---|
| 1 | — | — | — |
| 2 | Degree of certainty above threshold | (· · · · · ·) | — |
| 3 | Degree of certainty above threshold | (· · · · · ·) | (2, 0.7) |

| Operation No. | | Cluster number | Selected /Not-selected | Number of programs | Representative word |
|---|---|---|---|---|---|
| 1 | | 1 | Selected | 49 | Tokyo, Darwin, Hokkaido, Documentary, Amazing, Gourmet, Huge, Society/News |
| Number of target programs | 599 | 2 | Not-selected | 9 | Business man, Home page, Conte, Documentary, Company, Boss, Physical exercises, Mini |
| Command name | | 3 | Selected | 169 | World, Japan, Society/News, Special, Player, Manager, History, Soccer |
| Subdivision | | 4 | Not-selected | 372 | Guest, Cuisine, Variety, Quiz, Woman, Other, Ranking, Entrance |

⇒

(b)

| Operation No. | | Cluster number | Selected /Not-selected | Number of programs | Representative word |
|---|---|---|---|---|---|
| 2 | | 1 | Not-selected | 139 | World, Japan, Society/News, Special, NNK, Tokyo, Music, China |
| Number of target programs | 218 | 2 | Selected | 45 | Player, Documentary, Soccer, Japan, Tomorrow, Manager, Society/News, World Cup |
| Command name | | 3 | Selected | 19 | Discovery, Dramtic, Earth, World, Mystery, Ancient, Ruin, Wonder |
| Subdivision | | 4 | Not-selected | 15 | Darwin, Amazing, Animal, Huge, Maximum, Migration, Special topic, Mode of life |

⇒

(c)

| Operation No. | | Cluster number | Selected /Not-selected | Number of programs | Representative word |
|---|---|---|---|---|---|
| 3 | | 1 | Not-selected | 8 | Documentary, Tokyo, Child, Society/News, Club, Education, Teacher, Entry |
| Number of target programs | 64 | 2 | Selected | 37 | Player, Soccer, Japan, Tomorrow, Manager, World Cup, Medical services, Representative |
| Command name | | 3 | Not-selected | 1 | Cancer, Discovery, Japan, Sato, Chiba, Disease, People, Society/News |
| Subdivision | | 4 | Selected | 18 | Dramtic, Discovery, Earth, World, Mystery, Ancient, Ruin, Wonder |

| Operation No. | Cluster number | Selected /Not-selected | Representative word vector | Distance from previously selected representative word vector | | | | Extraction vector |
|---|---|---|---|---|---|---|---|---|
| 1 | | | | Cluster 1 | Cluster 2 | Cluster 3 | Cluster 4 | |
| Number of target programs | 1 | Selected | (·······) | — | — | — | — | — |
| 599 | 2 | Not-selected | — | — | — | — | — | — |
| Command name | 3 | Selected | (·······) | — | — | — | — | — |
| Subdivision | 4 | Not-selected | — | — | — | — | — | — |

1801 →

(b)

| Operation No. | Cluster number | Selected /Not-selected | Representative word vector | Distance from previously selected representative word vector | | | | Extraction vector |
|---|---|---|---|---|---|---|---|---|
| 2 | | | | Cluster 1 | Cluster 2 | Cluster 3 | Cluster 4 | |
| Number of target programs | 1 | Not-selected | — | — | — | — | — | — |
| 218 | 2 | Selected | (·······) | 0.2 | — | 0.7 | — | (·······) |
| Command name | 3 | Selected | (·······) | 0.0 | — | 0.2 | — | — |
| Subdivision | 4 | Not-selected | — | — | — | — | — | — |

1802 →  1803

(c)

| Operation No. | Cluster number | Selected /Not-selected | Representative word vector | Distance from previously selected representative word vector | | | | Extraction vector |
|---|---|---|---|---|---|---|---|---|
| 3 | | | | Cluster 1 | Cluster 2 | Cluster 3 | Cluster 4 | |
| Number of target programs | 1 | Not-selected | — | — | — | — | — | — |
| 64 | 2 | Selected | (·······) | — | 0.8 | 0.0 | — | (·······) |
| Command name | 3 | Not-selected | — | — | — | — | — | — |
| Subdivision | 4 | Selected | (·······) | — | 0.0 | 1.0 | — | (·······) |

FIG. 20

| Operation No. 1901 | Result of search-omitted information extraction determination 1902 | Class No. 1903 | Extraction vector 1904 | Distance from previous extraction vector (Operation No., Cluster No., Distance) 1905 |
|---|---|---|---|---|
| 1 | — | 1 | — | — |
|   |   | 2 | — | — |
|   |   | 3 | — | — |
|   |   | 4 | — | — |
| 2 | Degree of certainty above threshold | 1 | — | — |
|   |   | 2 | (......) | — |
|   |   | 3 | — | — |
|   |   | 4 | — | — |
| 3 | Degree of certainty above threshold | 1 | — | — |
|   |   | 2 | (......) | (2, 2, 0.7) |
|   |   | 3 | — | — |
|   |   | 4 | (......) | (2, 2, 0.0) |

INFORMATION SEARCH SUPPORT METHOD AND INFORMATION SEARCH SUPPORT DEVICE

TECHNICAL FIELD

The present invention relates to methods and devices thereof for supporting a user to find, from a lot of information, information interesting to the user, and in particular to an information search support method and an information search support device which narrow down information by recursively auto-assigning the information into clusters.

BACKGROUND ART

In recent years, different data ranging from information on contents such as TV programs and books to information on landmarks such as tourist spots and restaurants and on reputations and stocks of commercial products have been increasingly digitized. With the digitization of the data, there are growing needs of information search tools which help a user to find, from a lot of digitized information, information interesting to the user.

The most common method for searching interesting information from a lot of information is a keyword search method. In the keyword search method, a user inputs a word indicating an interest of the user as a search keyword, and a system searches information associated with the inputted search keyword using indices generated beforehand based on degrees of association between the keyword and documents, and presents a result of the search to the user.

The keyword search method is effective when an interest of the user is clear and the interest can be clearly expressed with a search keyword. However, since the inputted search keyword does not match the interest of the user when the interest of the user is vague or an appropriate search keyword indicating the interest is not conceived, a problem arises that information the user really wants to search is not ranked high in a search result.

To cope with such a problem, information to be searched is divided into clusters, and keywords and indices that represent the information included in each cluster are presented to the user so that contents of each cluster are informed to the user. Examples of an information search support method in which information is narrowed down in the above manner while giving a clue to the user having a vague information search purpose include the Scatter/Gather method (Non-patent Reference 1). In the Scatter/Gather method, when the user selects a cluster interested in by the user, a system first gathers information such as documents and contents which is included in the selected cluster once, then performs clustering again, and presents a result of the clustering to the user. Recursively repeating this process narrows down search targets and gradually clarifies a vague interest of the user. Consequently, the user will be able to easily find the information interesting to the user.

On the other hand, although the user selects a cluster using, as clues, keywords and an index that represent the cluster, it is difficult to know all the information included in the cluster only with the keywords and the index. Thus, a problem arises that "omission" in which information that matches the interest of the user and is included in a cluster that is not selected is omitted from a search target occurs when the user selects a cluster.

Patent Reference 1 is disclosed for this problem. In Patent Reference 1, assigning information to be searched into a single cluster is thought to cause the aforementioned problem, and a solution of the problem is attempted by calculating a degree of belonging of the information to be searched with respect to each of clusters, presenting a result of the calculation on a bar graph and the like, and suggesting other clusters to be selected.

Non-patent Reference 1: Scatter/Gather: A cluster-based approach to browsing large document collections. In Proceedings of the SIGIR'92 (pp. 318-329), 1992

Patent Reference 1: Japanese Unexamined Patent Application Publication No. 2003-345810

SUMMARY OF THE INVENTION

Problems that Invention is to Solve

However, as the degree of belonging to each cluster are visualized and presented for all the information to be searched in Patent Reference 1, in order to prevent the "omission" that is the problem to be solved by Non-patent Reference 1, the user needs to perform selection by referring to the degrees of belonging for all the information to be searched. For this reason, a problem arises that a burden to browse and evaluate the degrees of belonging on the user increases when the number of pieces of information to be searched becomes enormous.

Furthermore, another cause of the "omission" is a dynamic change of the interest of the user such as a case where the interest of the user is not determined when a search starts or a case where the interest of the user is changed in the middle of the search. In the information search support method in which recursive clustering to which Non-patent Reference 1 and Patent Reference 1 belong is used, a vague interest of the user is identified with clues such as representative keywords presented by the system, and a cluster selection is not always performed in consideration of the clear interest for a while after the search has started. For this reason, the cluster selection performed before the interest of the user is identified inevitably causes "oversight" and the "omission". Likewise, in the case where, having selected a cluster with an interest in a representative keyword at first, the user finds an index interesting to the user in the middle of the cluster selection and subsequently selects a cluster including representative keywords associated with the index, as the user is not aware of a new interest, it is highly likely that the "oversight" and the "omission" have occurred in the cluster selection performed before the cluster is subsequently selected. However, the degree of belonging of the information to be searched to each cluster is merely shown in Patent Reference 1, and the "oversight" and the "omission" caused by those causes cannot be addressed.

Means to Solve the Problems

The present invention has been conceived to solve the aforementioned problems, and an object of the present invention is to provide an information search support method and an information search support device which allow selection of a document or a content that matches an interest of a user without "oversight" or "omission" while corresponding to a dynamic change of the interest of the user and requiring no special operation of the user.

In order to solve the above problems, an information search support device according to the present invention is an information search support device which performs clustering on search-target information, displays information indicating a feature of each of clusters, narrows down information to be selected by performing further clustering on information included in a cluster selected by a user from among the displayed clusters, and supports information search by a user, said information search support device including: a cluster selection history information accumulation unit configured to accumulate content information of each cluster and cluster selection history information indicating a cluster selected by the user; a degree of certainty calculation unit configured to calculate a degree of certainty indicating a degree to which a vague search target of the user has been identified, based on the content information of the cluster and the cluster selection history information accumulated in the cluster selection history information accumulation unit; a search target estimation unit configured to obtain, from content information of the cluster selected by the user, a condition for estimating the search target of the user; a search-omitted information extraction unit configured to extract, from a cluster that is not selected by the user, search-omitted information that is information included in the cluster that is not selected by the user among the displayed clusters and is information belonging to a set of information estimated from the condition obtained by the search target estimation unit; and a search-omitted information addition unit configured to add, to the cluster selected by the user, the search-omitted information extracted by the search-omitted information extraction unit, in the case where the degree of certainty calculated by the degree of certainty calculation unit is equal to or higher than a predetermined threshold.

With this structure, a system extracts information interesting to a user from information that is not currently a search target by automatically determining whether or not a search target of the user has been identified and extracting information matching an interest of the user, using a characteristic of the user that a cluster is selected based on one or more representative words of the cluster, thereby changing contents of the current search target.

Effects of the Invention

As described above, the information search support device according to the present invention allows pieces of search-target information to be narrowed down so that the "oversight" and "omission" of the identified search target do not occur, without increasing a user's burden on searching information.

BRIEF DESCRIPTION OF DRAWINGS

FIG. 7 is a diagram showing a specific example of a cluster selection history for an operation, the cluster selection history being generated when subdivision is performed on the screen example shown in FIG. 4 and being stored in a cluster selection information storage unit.

FIG. 8 is a diagram showing an example of program information included in a selected cluster, the program information being stored in a candidate information storage unit.

FIG. 10(a)(b) is a diagram showing a specific example of data necessary for calculating a degree of certainty corresponding to the specific operation sequence shown in FIG. 9.

FIG. 12 is a diagram showing a result of extraction (program list) in the case where programs related to medical services are extracted from thirteen programs that belong to Cluster No.4 in Operation No.2 shown in FIG. 9, without adding any search-omitted programs.

FIG. 13 is a diagram showing a result of extracting programs related to medical services from clusters that are not selected in Operation No.1 and Operation No.2 shown in FIG. 9.

FIG. 14 is a diagram showing a result of adding, to the cluster selection history shown in FIG. 9, information indicating which cluster the eight programs related to the medical services shown in FIG. 13 have belonged to.

FIG. 17 is a diagram showing an example of data stored in association with the operation sequences shown in FIGS. 9 and 10.

FIG. 18(a)(b)(c) is a diagram showing a portion of information on the selection information shown in FIG. 7, the portion of the information being included in a cluster selection history and being stored in the cluster selection information storage unit in association with a specific operation sequence.

FIG. 19(a)(b)(c) is a diagram showing detailed contents of each of selected clusters corresponding to the cluster selection history shown in FIG. 18.

FIG. 20 is a diagram showing a relationship between an extraction vector generated through past clustering and an extraction vector generated through clustering subsequent to the past clustering.

Figure 1:
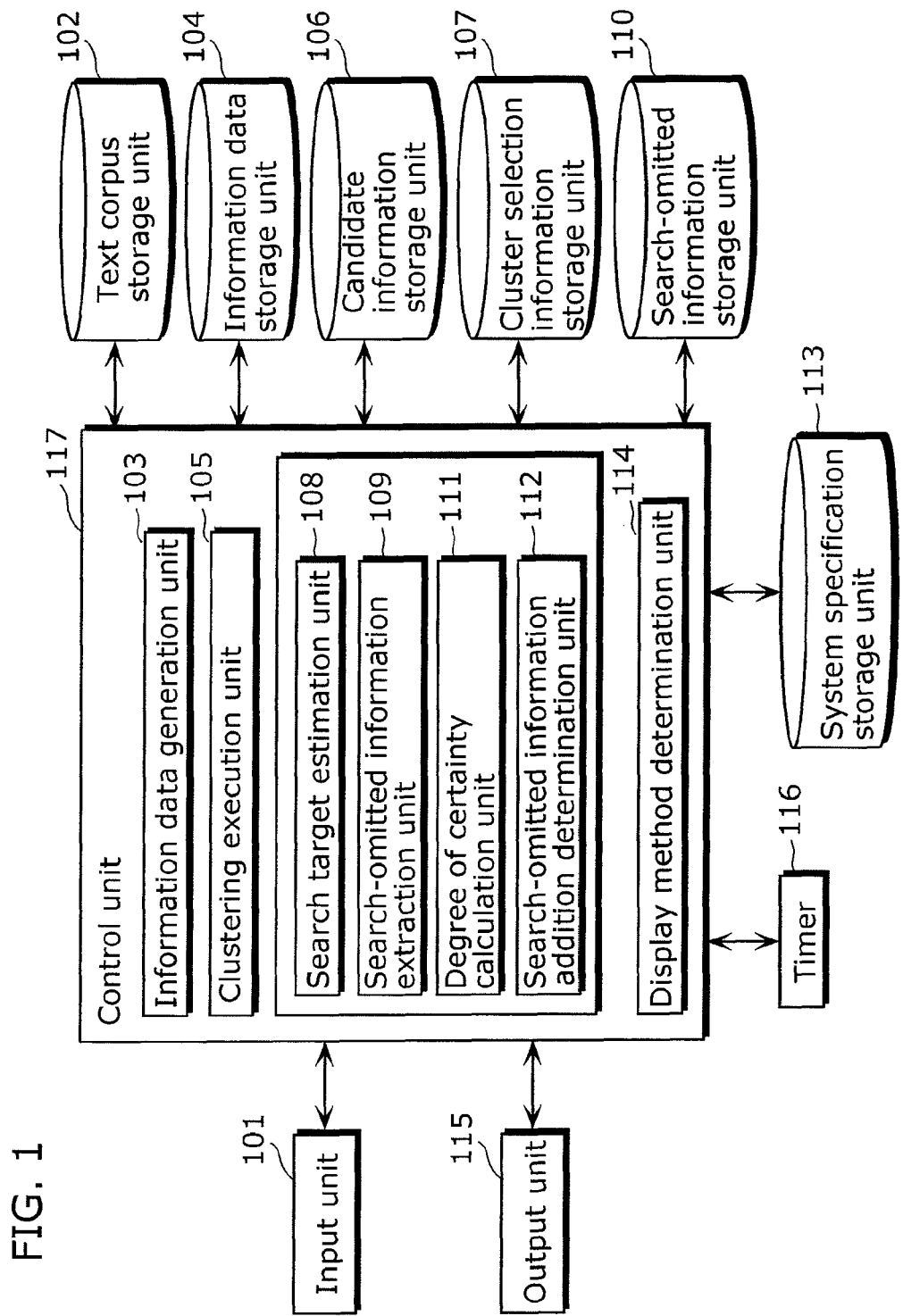
FIG. 1 is a block diagram showing a structure of an information search support device according to Embodiment 1.

NUMERICAL REFERENCES 101, 1401 Input unit
102, 1402 Text corpus storage unit
103, 1403 Information data generation unit
104, 1404 Information data storage unit
105, 1405 Clustering execution unit
106, 1406 Candidate information storage unit
107, 1407 Cluster selection information storage unit
108, 1408 Search target estimation unit
109, 1409 Search-omitted information extraction unit
110, 1410 Search-omitted information storage unit
111, 1411 Degree of certainty calculation unit 112 Search-omitted information addition determination unit
1412 Search-omitted information extraction determination unit
113, 1413 System specification storage unit
114, 1414 Display method determination unit
115, 1415 Output unit
116, 1416 Timer
117, 1317 Control unit

DETAILED DESCRIPTION OF THE INVENTION

The following will describe embodiments of the present invention with reference to the drawings.

Embodiment 1

FIG. 1 is a block diagram showing a structure of an information search support device according to Embodiment 1 of the present invention. In FIG. 1, the information search support device according to Embodiment 1 includes: an input unit 101; a text corpus storage unit 102; an information data generation unit 103; an information data storage unit 104; a clustering execution unit 105; a candidate information storage unit 106; a cluster selection information storage unit 107; a search target estimation unit 108; a search-omitted information extraction unit 109; a search-omitted information storage unit 110; a degree of certainty calculation unit 111; a search-omitted information addition determination unit 112; a system specification storage unit 113; a display method determination unit 114; an output unit 115; a timer 116; and a control unit 117. The input unit 101 receives an input from a user who uses a keyboard, a mouse, and a remote controller. A text corpus related to an information search target is stored in the text corpus storage unit 102. The information data generation unit 103 converts target information in a format of the text corpus stored in the text corpus storage unit 102 into a data format necessary for information search support. The information data storage unit 104 stores data generated by the information data generation unit 103. The clustering execution unit 105 executes clustering on an entire search area in an initial state and a portion of the search area selected by the user when information search is performed. The candidate information storage unit 106 stores information included in a selected cluster or identification information for identifying the information included in the selected cluster. The cluster selection information storage unit 107 is an example of "a cluster selection history information accumulation unit configured to accumulate content information of each cluster and cluster selection history information indicating a cluster selected by the user", and stores selection information of the user. The search target estimation unit 108 is an example of "a search target estimation unit configured to obtain, from content information of a cluster selected by the user, a condition for estimating the search target of the user", and obtains a condition for estimating a search target of the user from the cluster selection information of the user stored in the cluster selection information storage unit 107. The search-omitted information extraction unit 109 is an example of "a search-omitted information extraction unit configured to extract, from a cluster that is not selected by the user, search-omitted information that is information included in the cluster that is not selected by the user among the displayed clusters and is information belonging to a set of information estimated from the condition obtained by the search target estimation unit", and extracts, among information included in the search target, search-omitted information that is not stored in the candidate information storage unit 106. The search-omitted information storage unit 110 stores the search-omitted information extracted by the search-omitted information extraction unit 109. The degree of certainty calculation unit 111 is an example of "a degree of certainty calculation unit configured to calculate a degree of certainty indicating a degree to which a vague search target of the user has been identified, based on the content information of the cluster and the cluster selection history information accumulated in the cluster selection history information accumulation unit", and calculates a degree of certainty of the search target estimated. The search-omitted information addition determination unit 112 is an example of "a search-omitted information addition unit configured to add, to the cluster selected by the user, the search-omitted information extracted by the search-omitted information extraction unit, in the case where the degree of certainty calculated by the degree of certainty calculation unit is equal to or higher than a predetermined threshold", and determines whether or not the search-omitted information is added to candidate information based on the degree of certainty calculated by the degree of certainty calculation unit 111. The system specification storage unit 113 stores a state transition of a system, a screen specification, and the like. The display method determination unit 114 determines screen information and audio information to be outputted to the output unit 115. The output unit 115 causes a display and the like to display clusters and a list of information, and a speaker and the like to give voice guidance for operation. The timer 116 counts a time. The control unit 117 includes: the information data generation unit 103; the clustering execution unit 105; the search target estimation unit 108; the search-omitted information extraction unit 109; the degree of certainty calculation unit 111; the search-omitted information addition determination unit 112; and the display method determination unit 114, and performs overall control of omitted-information extraction performed by each of these processing units.

An overview of operations of the information search support device structured as above will be described with reference to FIG. 2.

Figure 2:
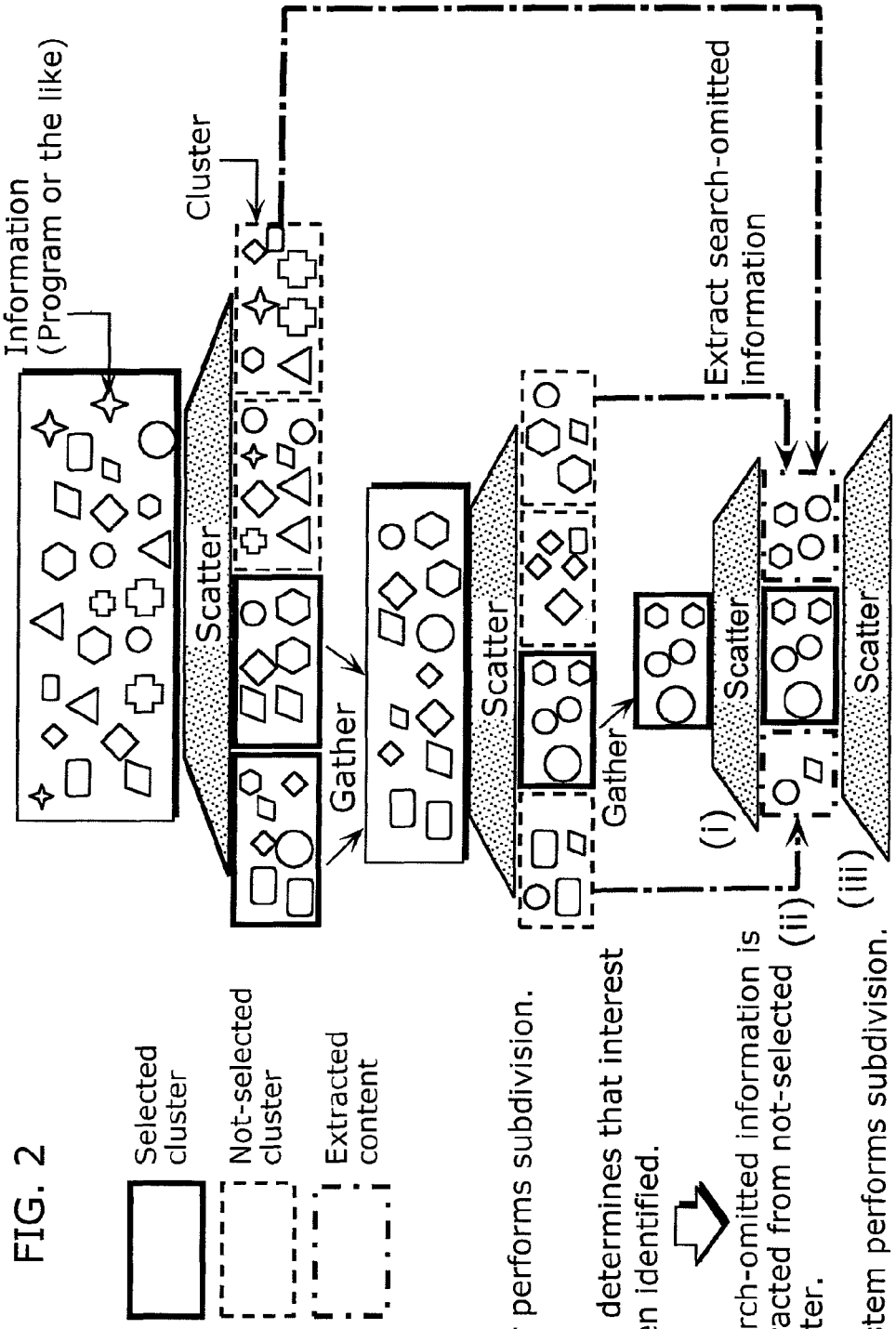
FIG. 2 is a diagram showing a gist of operations of the information search support device according to Embodiment 1.

FIG. 2 is a diagram showing a gist of the operations of the information search support device according to Embodiment 1. A user having a vague search request selects at least one cluster interesting to the user from among clusters presented by the information search support device to be described in Embodiment 1. The information search support device gathers the at least one cluster, performs clustering again to divide the gathered cluster into smaller clusters, supports narrowing down a scope of an interest of the user by presenting the smaller clusters, and provides information interesting to the user. However, when a vague interest of the user is identified, it is likely that the information interesting to the user is included in clusters that are not yet selected. Accordingly, the information search support device automatically determines that the interest of the user has been identified, based on a selection history of the user; extracts, from clusters that are not selected at times of past search, information that is omitted from the past search due to the vague interest of the user, when it is determined that the interest of the user has been identified; and adds the information to a currently selected set of information. These operations allow the information interesting to the user to be presented to the user without much omission.

Figure 3:
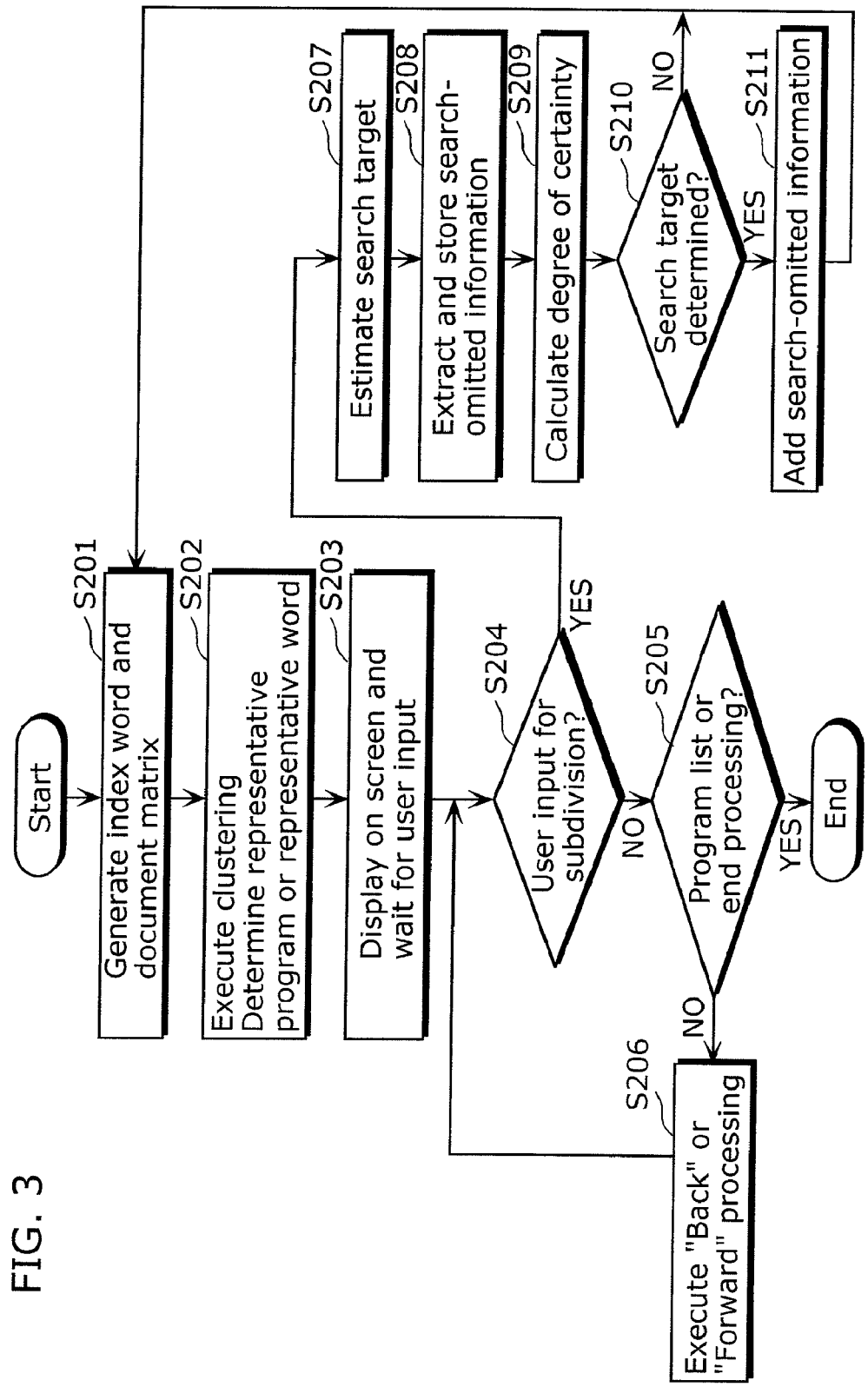
FIG. 3 is a flow chart showing operations for supporting a user to find a program interesting to the user from a lot of programs, the operations being performed by the information search support device according to Embodiment 1 by using data of an Electric Program Guide (EPG), and the user having no particular program to watch.

The following will describe an example of detailed operations with reference to a flow chart shown in FIG. 3. It is to be noted that FIG. 3 is the flow chart showing operations for supporting a user to find a program interesting to the user from a lot of programs, the operations being performed by the information search support device according to Embodiment 1 by using data of an Electric Program Guide (EPG), and the user having no particular program to watch.

Embodiment 1 will describe an example where the search target estimation unit 108 obtains, from selection information indicating a selection history of the user, a condition for estimating a search target of the user and extracts search-omitted information every time the user selects a cluster and orders further clustering. The search-omitted information indicates information not included in the selected cluster, the information being similar to an estimated search target. Here, the search-omitted information addition determination unit 112 determines that a vague search target of the user has been identified, when a degree of certainty of a result of estimation calculated by the degree of certainty calculation unit 111 exceeds a predetermined value, and accordingly the extracted search-omitted information is added to a current search target.

First, in step S201, the information data generation unit 103 obtains EPG data stored in the text corpus storage unit 102, that is, text data structured in relation to each of programs. Next, words (hereinafter, index words) for use in clustering the programs and extracting search-omitted programs are determined, a relationship between the index words and a descriptive text (hereinafter, simply referred to as document) of each program such as how many index words the document includes is calculated, and a result of the calculation is stored in the information data storage unit 104. More specifically, the information data generation unit 103 mainly calculates a term frequency (TF) value indicating how frequently each of index words appears in a corresponding document, a document frequency (DF) value indicating the number of documents in which an index word appears, and an inverse document frequency (IDF) value based on the DF value, and stores the result of the calculation in the information data storage unit 104. Further, the information data generation unit 103 generates an index word and document matrix expressing the relationship between the index words and the documents in a matrix, using these values, and stores the generated index word and document matrix in the information data storage unit 104.

Here, for instance, as regular EPG data includes "Genre", "Title", and "Detailed Content" as text information, a combination of these is used as a descriptive text (document) for each program. Moreover, in an index word determination method, a morphological analysis may be performed on each document and a word having a specific part of speech may be used as an index word, or a proper noun may be extracted using a proper noun extraction technique and the extracted proper noun may be used as such.

In step S202, the clustering execution unit 105 executes clustering using the index word and document matrix generated by the information data generation unit 103. Existing clustering methods are used for the clustering. For example, the Ward's method, a type of hierarchical clustering, may be used, or the k-means clustering, a type of nonhierarchical clustering, may be used. In both methods, each document is represented as a vector based on the index word and document matrix, and clustering is performed by calculating distances in a document vector space.

Next, the clustering execution unit 105 determines representative programs and representative words for each of clusters generated. In a method for determining representative programs in a cluster, for instance, a center of gravity vector with respect to document vectors in each cluster is calculated, and programs in close distance from the center of gravity are the representative programs. Furthermore, an index word having a large component of the center of gravity vector with respect to each cluster may be a representative word for each cluster, or a word having large TF and DF values in a document of each cluster may be the representative word for each cluster.

The result of clustering determined by the clustering execution unit 105 is stored in the candidate information storage unit 106 and the cluster selection information storage unit 107, and is also outputted to the display method determination unit 114.

Figure 4:
FIG. 4 is a diagram showing a screen example on which clusters determined by a clustering execution unit are outputted by an output unit.

In step S203, the display method determination unit 114 outputs the result of the clustering to the output unit 115 based on a screen specification stored in the system specification storage unit 113. FIG. 4 is a diagram showing a screen example on which clusters determined by the clustering execution unit 105 are outputted by the output unit 115. Here, columns 301 each show representative words of a corresponding one of clusters. For example, specific representative words of a cluster are listed as "Word 1", "Word 2", . . . , "Word 5" in this column. Columns 302 each show representative programs of a corresponding one of the clusters. Programs in the closest distance from a center of gravity, for instance, programs ranked in the top 5, are displayed as representative programs of a cluster in this column, the gravity center being shown by a gravity center vector with respect to each of programs included in the cluster. For instance, representative programs are listed as specific program names such as "1. Program name 2-1", "2. Program name 2-2", . . . , "5. Program name 2-5". Columns 303 each show the number of programs included in a corresponding one of the clusters. Columns 304 each are a check box that can be checked to indicate whether or not the user has selected a cluster. For example, when the check box is checked, it is indicated that the cluster has been selected, and when the check box is not checked, it is indicated that the cluster has not been selected. A subdivision button 305 is a button for causing the information search support device to execute a narrowing down process (hereinafter, simply referred to as to perform subdivision) by performing clustering again on the cluster which the user has selected by checking the check box. A program list button 306 is a button for switching a screen to another screen which displays a program list of the cluster which the user has selected by checking the check box. When the user presses this button, for instance, in the case where check boxes of two clusters are checked as shown in FIG. 4, all the programs included in the two clusters are displayed in a list. Arrow buttons 307 are a button for returning to a previous selection state and a button for advancing to a next selection state, respectively. It is to be noted that operations and items displayed when each of these buttons is pressed are not limited to the example shown in FIG. 4, and are based on definitions stored in the system specification storage unit 113.

Figure 5:
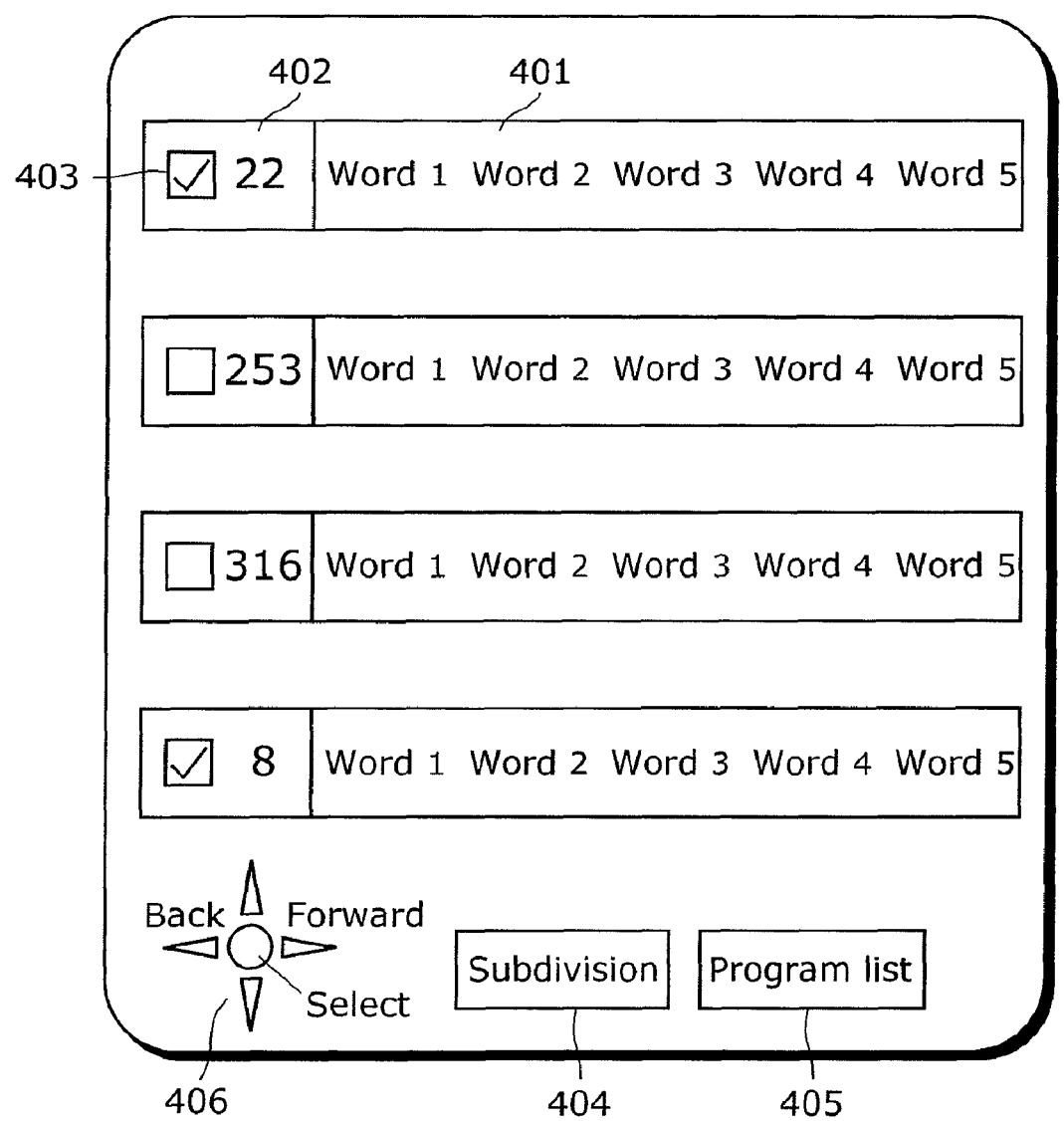
FIG. 5 is a diagram showing another screen example in the case where the clusters determined by the clustering execution unit are outputted by the output unit.
Figure 6:
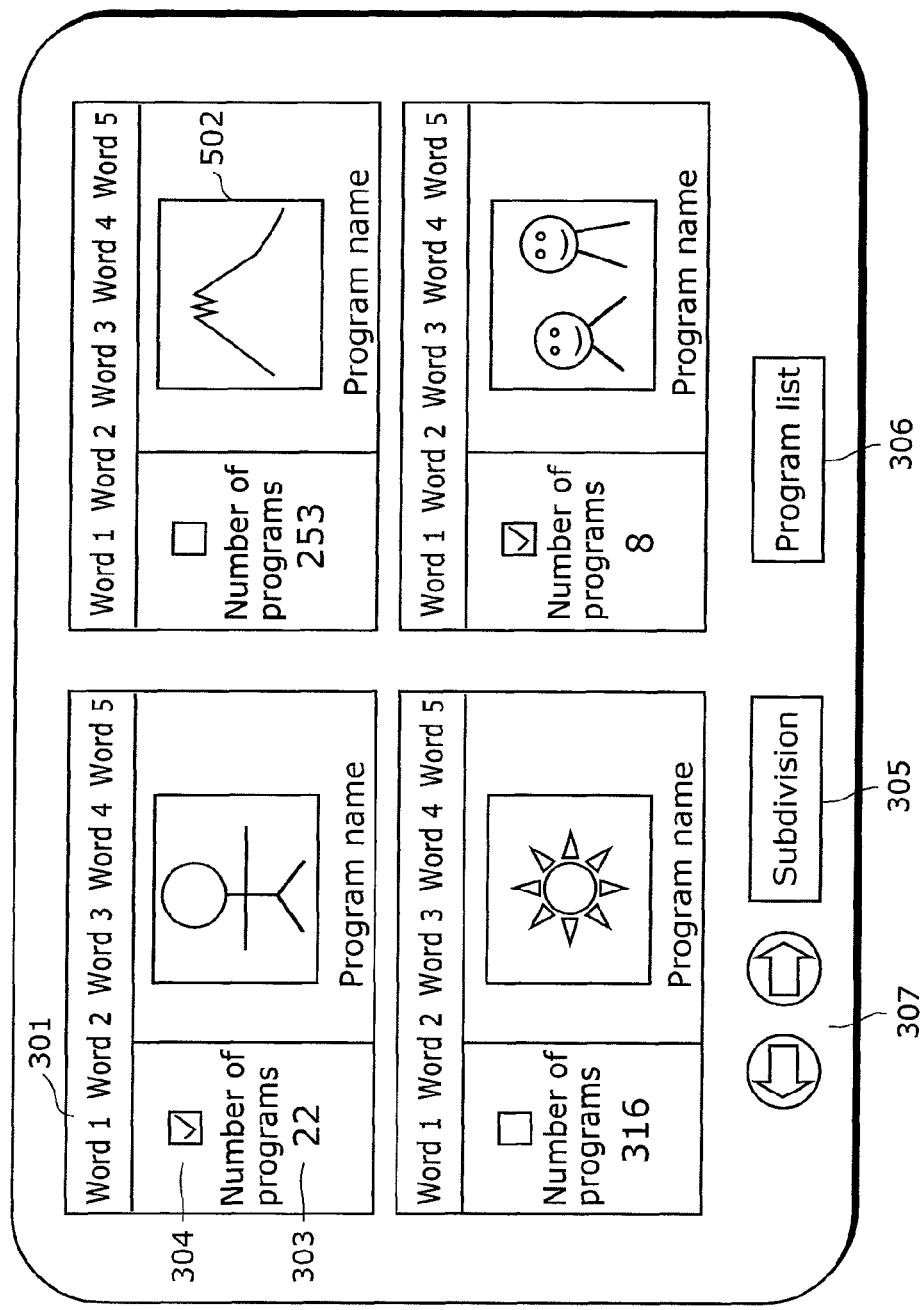
FIG. 6 is a diagram showing still another screen example in the case where the clusters determined by the clustering execution unit are outputted by the output unit.

Although five representative programs and five representative words are displayed as shown in FIG. 4 in the present embodiment, the numbers of representative programs and representative words that are to be displayed may be displayed as many as possible. Further, instead of displaying only the representative programs of each cluster, all the programs may be displayed in a list. FIG. 5 is a diagram showing another screen example in the case where the clusters determined by the clustering execution unit 105 are outputted by the output unit 115. For example, in the case where a screen is small in size, only representative words may be displayed for each cluster as shown in FIG. 5. without displaying representative programs. In FIG. 5, columns 401 each show the representative words of a corresponding one of the clusters, columns 402 each show the number of programs included in a corresponding one of the clusters, and columns 403 each are a check box indicating selected/not-selected when being checked. Both a subdivision button 404 and a program list button 405 are the same as the subdivision button 305 and the program list button 306 shown in FIG. 4. A cross-shaped button 406 is a cursor key. Processing a triangle-shaped button (Back) indicating a left direction returns to a previous screen, and pressing a triangle-shaped button (Forward) advances to a next screen. Pressing top and bottom triangle-shaped buttons moves a cursor up and down on the check box of each cluster, and pressing a round center selection button when the cursor is stopped at a position checks a check box on the position of the cursor. FIG. 6 is a diagram showing still another screen example in the case where the clusters determined by the clustering execution unit 105 are outputted by the output unit 115. For instance, instead of displaying the representative programs, a portion of a video of different programs and a thumbnail may be displayed with a corresponding program name at a fixed time interval as shown by 502 in FIG. 6.

It is to be noted that, in a method for selecting a program to be finally viewed by the user, although a specification is assumed that the user selects the program list button 306 of the clusters selected by the user and selects a program from among programs after seeing a program list, a specification may be possible that a program is selected by directly designating the program out of the representative programs shown by the column 302 in FIG. 4.

The present embodiment will describe the operations of the information search support device with reference to FIG. 3, using an example where the user selects a program on a menu screen having the aforementioned hierarchical structure as shown in FIGS. 4 to 6.

In step S204, the control unit 117 determines a user's command that has been inputted by the input unit 101. In the case where the user did not press the subdivision button, the flow is advanced to step S205. In step S205, it is determined whether the program list button has been pressed or an end command has been inputted, and in the case where either the program list button has been pressed or the end command has been inputted, a process is performed. On the other hand, in the case where an operation for "Back" or "Forward" is operated in step S204, the control unit 117 obtains necessary information from the cluster selection information storage unit 107 and performs a process in step S206. The flow is then returned to step S204. In step S204, in the case where the user input is for a subdivision command, the flow is advanced to step S207.

Furthermore, in step S204, the user input and a system state that have been determined by the control unit 117 are stored in the cluster selection information storage unit 107, and programs included in a selected cluster are stored in the candidate information storage unit 106. FIG. 7 is a diagram showing a specific example of a cluster selection history for an operation, the cluster selection history being generated when subdivision is performed on the screen example shown in FIG. 4 and being stored in the cluster selection information storage unit 107. The cluster selection information storage unit 107 is an example of the "cluster selection history information accumulation unit configured to accumulate, as the content information of each cluster, one of the following: the number of pieces of information included in the selected cluster; the number of clusters selected from among the displayed clusters; and the number of documents including a representative word representing the selected cluster among documents indicating contents of the search-target information". Item 601 shows Operation No. in FIG. 7, and an operation serial number of a command inputted by a user is described in Operation No., for instance. Command input is, for example, performed by the user by pressing a button such as the subdivision button 305 and the program list button 306 that are displayed on the menu screen shown in FIG. 4. Item 602 shows a screen display start time, and a time when the menu screen shown in FIG. 4 is displayed is described therein, for instance. Item 603 shows a command name of a command inputted through an operation, and "subdivision", a command name of a command inputted by pressing the subdivision button, and the like are described therein, for example. Item 604 shows a time when a command indicated with a command name in the item 603 has been executed. Item 605 shows the total number of programs included in all the clusters. Item 606 shows a cluster number, and a cluster serial number is described therein, for instance. Item 607 shows selection/nonselection information indicating whether or not a cluster has been selected. Item 608 shows the number of programs included in each cluster. Item 609 shows one or more representative words of each cluster. Item 610 shows one or more representative programs included in each cluster. FIG. 8 is a diagram showing an example of program information included in a selected cluster, the program information being stored in the candidate information storage unit 106. A program number uniquely pre-assigned to a program is described in item 701. A program name is described in item 702. Further, a program content is described in item 703. For instance, a content of EPG data is used for the program content. It is to be noted that although information related to the aforementioned three items is stored in the candidate information storage unit 106, only program numbers 701 may be stored in the candidate information storage unit 106. When a phase for finally displaying a program list and so on comes, the text corpus storage unit 102 in which information of each program is structured and accumulated may be searched, using the stored program numbers as keys, and detailed information (e.g., a program name, a detailed content, and so on) of each program may be obtained.

Figure 9:
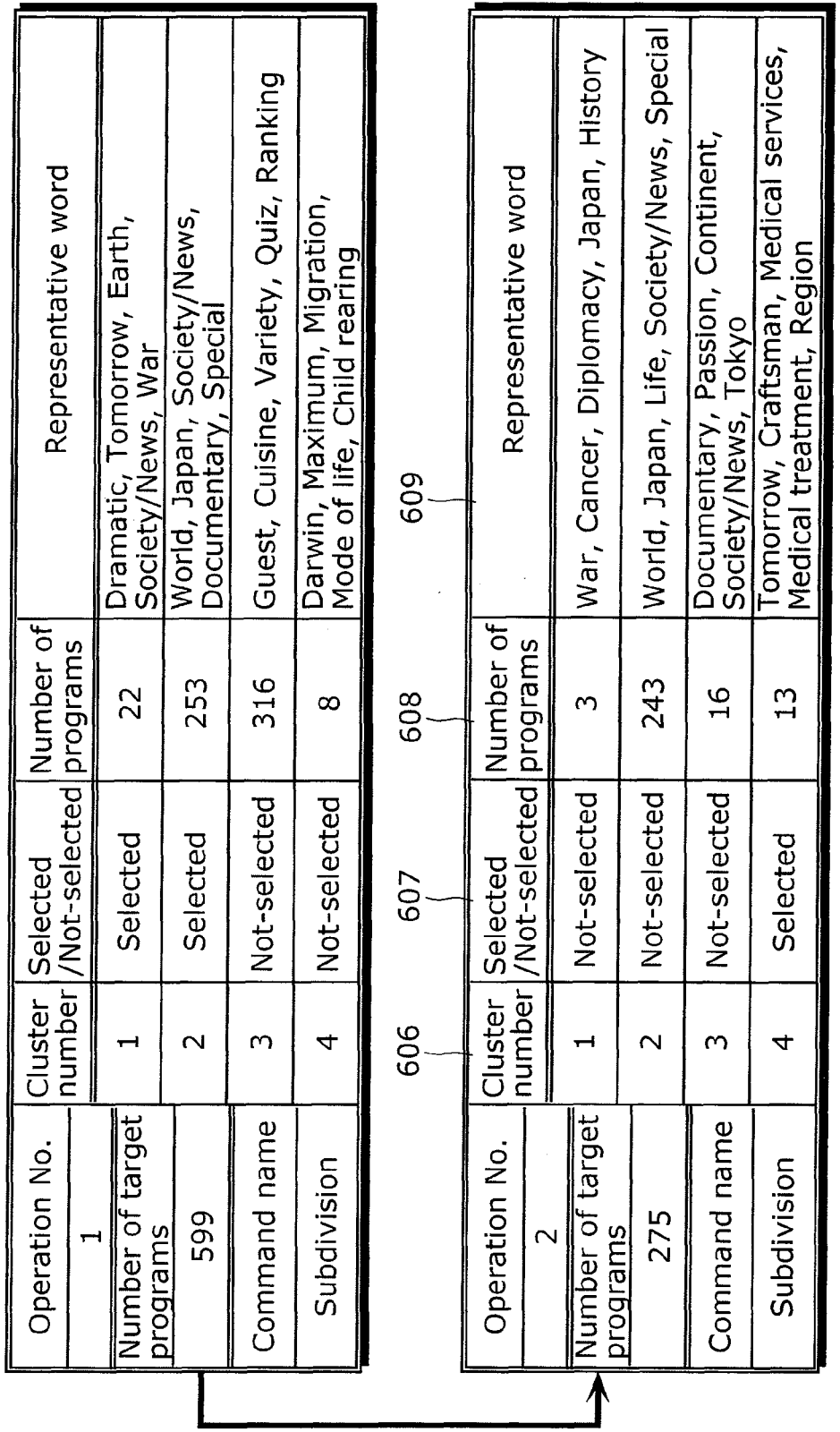
FIG. 9 is a diagram showing a portion of information included in the cluster selection history shown in FIG. 7, the portion of the information being associated with a specific sequence.

The following will describe a method for adding search-omitted information, again with reference to FIG. 3, using an example of a specific cluster selection history shown in FIG. 9, the method being performed in steps S207 to S211. FIG. 9 is a diagram showing a portion of information included in the cluster selection history shown in FIG. 7, the portion of the information being associated with a specific sequence.

It is to be noted that it becomes necessary to perform addition of search-omitted information that is information similar to a search target included in a cluster that is not selected for subdivision when a vague search target of the user is identified. Accordingly, in order to show how much the search target has been identified, a degree to which the search target of the user has been identified is quantified as a degree of certainty. The degree of certainty is quantified based on information on how much a cluster selected by the user has become a narrowed down region or on how much the cluster has been narrowed down since a previous selection. Here, the degree of certainty calculation unit 111 is an example of the "degree of certainty calculation unit configured to calculate, for certain content information of the cluster accumulated in the cluster selection history information accumulation unit, the degree of certainty, according to a rule that the degree of certainty becomes higher as the number of pieces of content information becomes smaller". The degree of certainty calculation unit 111 can use, as information to be used for calculating the degree of certainty, the number of clusters selected by the user, a DF value of a representative word, the number of representative programs, and an amount of change in the number of representative programs. This is based on an idea that the search target of the user is increasingly identified as the number of clusters decreases, since a word relevant to the fewer number of programs is selected as the DF value of the representative word becomes smaller and a cluster is a more narrowed-down region as the number of representative programs decreases.

The search target estimation unit 108 is an example of the "search target estimation unit configured to obtain, as the condition, a representative word representing the selected cluster", and obtains a condition for estimating a search target of the user based on a cluster selection of the user stored in the cluster selection information storage unit 107 in step S207. Here, a representative word of the cluster selected by the user is extracted, and is used as the condition for estimating the search target of the user. It is to be noted that although the representative word of the cluster selected by the user is used as the condition for estimating the search target of the user here, in the case where program names included in a cluster are displayed, as display information, for each cluster as shown in FIG. 4, words included in the program names may be used as the condition for estimating the search target of the user, and words having strong relevance to the cluster, among words that are not displayed on an output screen but are used for program information included in the cluster, may be used as the condition for estimating the search target of the user by using a TF value, a DF value, an IDF value, and so on.

It is to be noted that, in the example shown in FIG. 4, "words that are not displayed on an output screen but are used for program information included in a cluster" are words included in program titles and program contents of programs other than the 5 displayed representative programs.

The search-omitted information extraction unit 109 is an example of the "search-omitted information extraction unit configured to generate an extraction vector for extracting the search-omitted information from the information included in the cluster that is not selected by the user, using a vector obtained from the representative word obtained by the search target estimation unit", and generates a vector (hereinafter, simply referred to as extraction vector) used for extracting a search-omitted program in step S208. The extraction vector is generated by generating, from the index word and document matrix, vectors of the representative words in the to-be-searched cluster of the user, which is estimated in step S207, and by figuring out a sum of the vectors.

Next, the search-omitted information extraction unit 109 extracts a search-omitted program from a program region included in a non-selected cluster, using the generated extraction vector. More specifically, vectors each corresponding to one of programs included in the non-selected cluster are generated from a index word and document matrix, a distance between each vector and the extraction vector is calculated, and a program having a distance larger than a threshold is extracted as a search-omitted program.

It is to be noted that the number of search-omitted programs to be extracted may be determined not by the threshold but according to the number of programs included in a currently selected cluster or the number of all the programs to be searched. For example, the number of the programs to be extracted may be less than half of the number of the programs in the currently selected cluster. A limit of this range may be determined by a predetermined constant value or according to past change in the number of the programs. For instance, for a user who always performs narrowing down to less than half, control is performed so that an amount of change is not equal to more than half. With the control, it is possible to prevent the number of programs, which is obtained as a result of narrowing down, from exceeding the number of programs before the narrowing down is performed by extracting one or more search-omitted programs, though the narrowing down is performed.

Next, the search-omitted information extraction unit 109 stores the one or more search-omitted programs in the search-omitted information storage unit 110. As information to be stored, information such as program numbers, program names, and program contents is stored, the information being stored in the candidate information storage unit 106 and corresponding to the programs included in the selected cluster.

In step S209, the degree of certainty calculation unit 111 calculates a degree of certainty for the search target of the user estimated in step S207, based on the information stored in the cluster selection information storage unit 107. First, the degree of certainty calculation unit 111 obtains data necessary for calculating the degree of certainty from the cluster selection information storage unit 107, performs the calculation, and stores the result of the calculation in the cluster selection information storage unit 107. FIG. 10($a$)($b$) is a diagram showing a specific example of data necessary for calculating a degree of certainty corresponding to the specific operation sequence shown in FIG. 9. Item 901 shows Operation No. in FIG. 10($a$)($b$). Item 902 shows the number of target programs included in a currently selected cluster and an amount of change in the number of programs from the number of target programs included in a previously selected cluster. Item 903 shows the number of clusters currently selected and an amount of change in the number of the selected clusters from the number of clusters previously selected. Items 904 and 905 show representative words included in the selected cluster and DF values of the representative words, respectively. Item 906 shows the sum of the DF values (item 905) of the representative words shown in item 904 and an amount of change of the sum of the DF values of the representative words from the sum of DF values of the representative words included in the previously selected cluster. Item 907 shows an average value of the DF values (item 905) of the representative words shown in item 904 and an amount of change of an average value from an average value of the DF values of the representative words included in the previously selected cluster. Item 910 shows a degree of certainty that will be described below.

It is to be noted that, here, a value that is obtained by subtracting the number of current target programs from the number of previous target programs and by dividing a result of the subtraction with the number of the current target programs is used as the amount of change in the number of the target programs shown in item 902. A value that is a target value obtained by subtracting a current value from a previous value is used as an amount of change of each of other items. In other words, an equation is expressed as below.

(amount of change in the number of target programs)= [(the number of previous target programs)−(the number of current target programs)]/(the number of current target programs)

Next, the degree of certainty calculation unit 111 calculates the degree of certainty. The degree of certainty is quantified using information that changes as the search target of the user is identified as described above. Multiplicative inverse×100 of the average DF value is used as a degree of certainty in the present embodiment. To put it differently, an equation is expressed as below.

(degree of certainty)=100/(average DF value)

In step S210, the search-omitted information addition determination unit 112 determines whether or not the search target of the user has been identified using the degree of certainty calculated in step S209. That is, when the degree of certainty defined by using the DF value is equal to or higher than a threshold, it is determined that the search target of the user has been identified. More specifically, assuming that the threshold is 5.0, when a system is in Operation No.1 state as shown in FIG. 10(a), a degree of certainty is 1.8 and is a value smaller than the threshold. Consequently, the search-omitted information addition determination unit 112 determines that the search target of the user has not been identified, and does not perform addition of search-omitted information. The flow is then advanced to step S201. On the other hand, when the system is in Operation No.2 state as shown in FIG. 10(b), a degree of certainty is 9.6, and the search-omitted information addition determination unit 112 determines that the search target of the user has been identified since the degree of certainty is higher than the threshold 5.0. The flow is then advanced to step S211. It is to be noted that the threshold of the DF value used as the degree of certainty may be determined by a system developer based on a distribution of the number of all the pieces of target information and DF values or by performing a user evaluation experiment and studying a distribution of DF values when a region to be narrowed down by the user has been identified.

In step S211, the search-omitted information addition determination unit 112 adds the one or more programs included in the selected cluster which are stored in the candidate information storage unit 106 in step S204 and the one or more search-omitted programs stored in the search-omitted information storage unit 110 in step S208. The flow is then advanced to step S201, and the clustering is executed in step S202.

Figure 11:
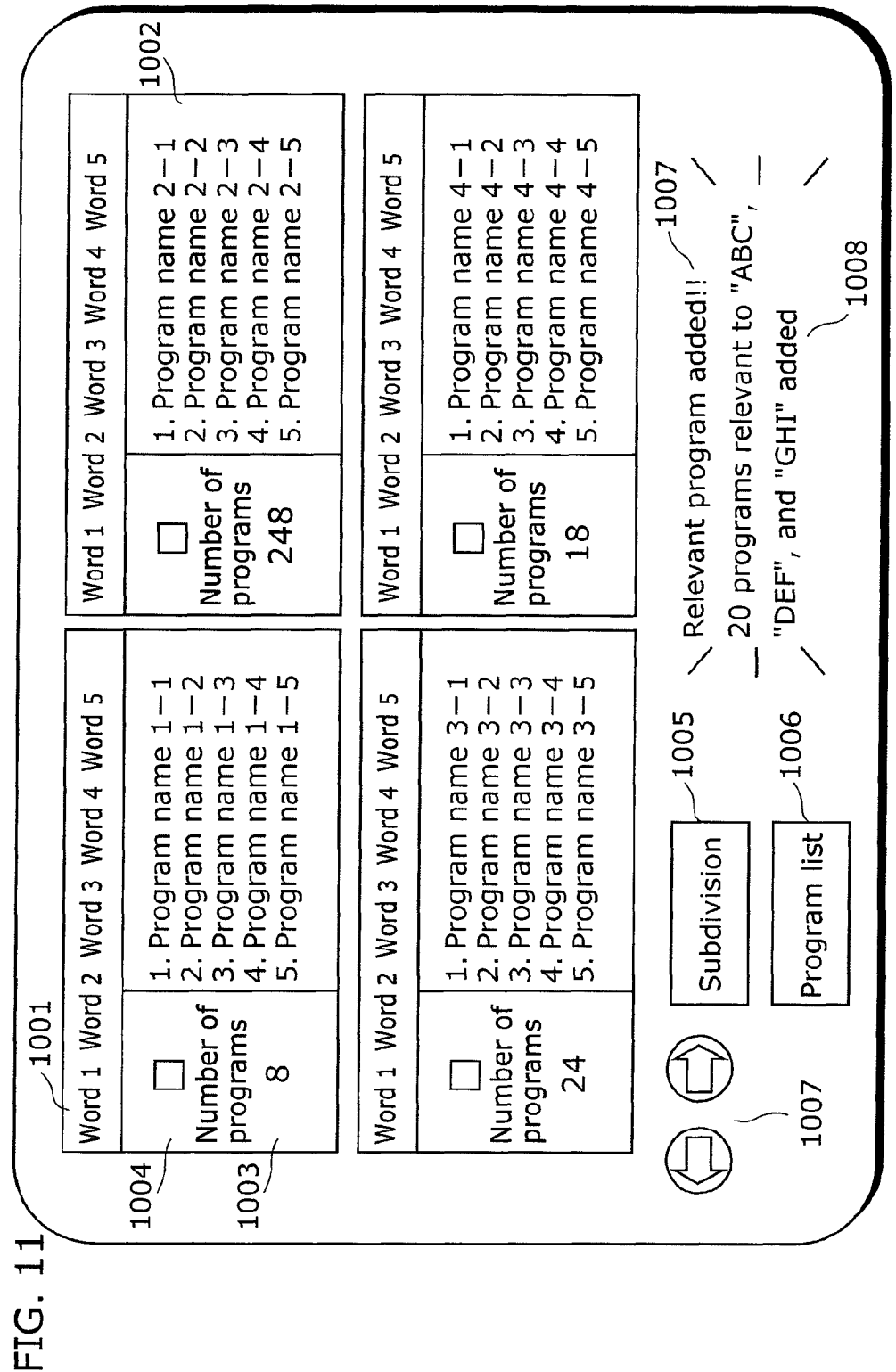
FIG. 11 is a diagram showing an example of an output screen which displays that search-omitted programs are extracted and added to subdivision targets.

It is to be noted that when the one or more search-omitted programs are added, the display method determination unit 114 may output, to a display screen, information that the one or more search-omitted programs have been added. This is because the user is likely to feel a sense of discomfort since automatic addition of the one or more search-omitted programs increases the number of pieces of information even though the user has been narrowing down information. FIG. 11 is a diagram showing an example of an output screen which displays that search-omitted programs are extracted and added to subdivision targets. More specifically, as shown in FIG. 11, the extraction of the search-omitted programs (item 1007) and information regarding which program relevant to what word is extracted (item 1008) may be outputted to the output screen.

Moreover, in order to facilitate better understanding of programs and access to the programs when it is determined that the search target of the user has been identified, an output screen which does not display specific programs in a list as shown in FIGS. 5 and 6 may be outputted until it is determined that the search target of the user has been identified, and an output screen which displays specific programs as shown in FIG. 4 may be outputted after it is determined that the search target of the user has been identified.

Here, assuming that a search target of the user is narrowed down to medical services in Operation No.2 shown in FIG. 9, a difference in program lists between a case where no search-omitted program is added and a case where one or more search-omitted programs are added will be described. In other words, an example of a result of extracting the one or more search-omitted programs through the aforementioned processing will be described.

FIG. 12 is a diagram showing a result of extraction (program list) in the case where programs related to medical services are extracted from thirteen programs that belong to Cluster No.4 in Operation No.2 shown in FIG. 9, without adding any search-omitted programs. Here, item 1101 shows a program number, item 1102 a program name, and item 1103 a program content. When what the user is narrowing down is identified with something associated with medical services, the number of programs belonging to Cluster 4 selected by the user is 13, and representative words of Cluster 4 are "Tomorrow, Craftsman, Medical services, Medical treatment, and Region". Among those, the number of programs related to the medical services is 2. FIG. 12 shows the two programs. In this case, as the one or more search-omitted programs included in the non-selected clusters are not added in Operation No.1 and Operation No.2, the result of extracting the two programs is the same as a result obtained by a conventional method.

FIG. 13 is a diagram showing a result of extracting programs related to medical services from clusters that are not selected in Operation No.1 and Operation No.2 shown in FIG. 9. Here, item 1201 shows a program number, and item 1202 shows a program name. Further, item 1203 shows a program content. As stated above, in addition to the two programs shown in FIG. 12, eight programs related to the medical services are extracted as the result of extracting the search-omitted programs from the non-selected clusters.

Figure 14:
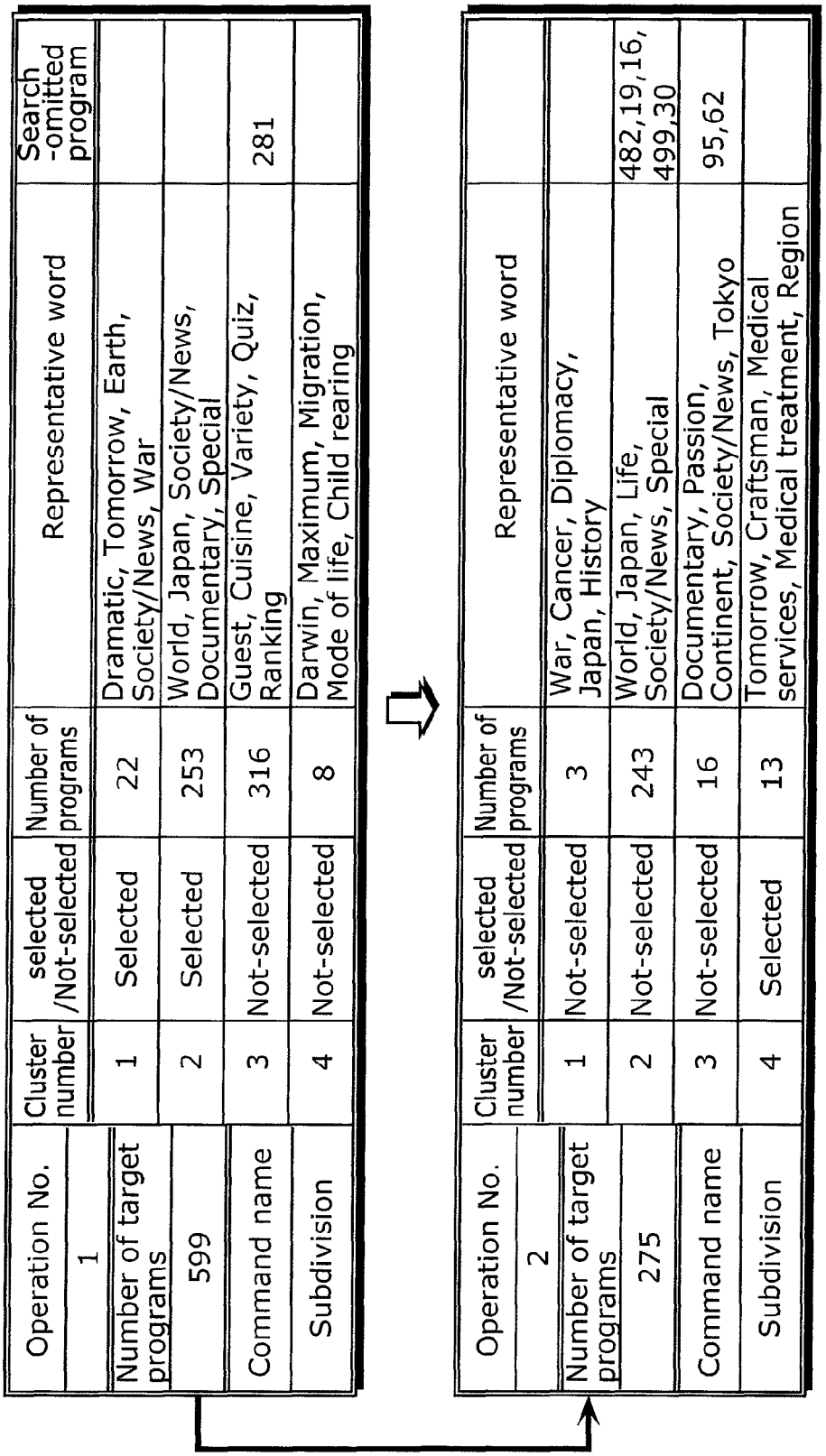

FIG. 14 is a diagram showing a result of adding, to the cluster selection history shown in FIG. 9, information indicating which cluster the eight programs related to the medical services shown in FIG. 13 have belonged to. As shown in FIG. 14, it is obvious that Cluster 3, which is not selected by the user when the system is in Operation No.1 state, includes a program having a program number 281, that Cluster 2, which is not selected by the user when the system is in Operation No.2 state, includes five programs each having a corresponding one of program numbers 482, 19, 16, 499, and 30, and that Cluster 3, which is not selected by the user when the system is in Operation No.2 state, includes two programs each having a corresponding one of program numbers 95 and 62. As stated above, the information search support device according to the present embodiment can extract the one or more search-omitted programs even in the case where the one or more search-omitted programs are included in the non-selected clusters. Here, it is obvious that Cluster 2, the cluster that is not selected in Operation No.2 shown in FIG. 14, has the largest number of the search-omitted programs related to the medical services. As words such as "Life" and "Society/News" among the representative words of the cluster seem related to the medical services, the user can understand that the cluster includes one or more programs related to the medical service, but the oversight is thought to have occurred since the representative words do not include words directly related to the medical services.

As described above, the aforementioned operations allow the information search support device according to the present embodiment to estimate the search target of the user from the selection information of the user (cluster selection history), to extract, from each of one or more clusters that are not selected by the user, the search-omitted information estimated as the search target of the user, and to cause the degree of certainty calculation unit 111 to calculate the degree of certainty which indicates whether or not the search interest of the user has been identified. Moreover, it becomes possible to add, to programs to be searched, the one or more programs extracted by the search-omitted information extraction unit 109, according to the calculated degree of certainty, and to further execute clustering. For this reason, the user does not need to inform the information search support device that the search target has been identified, only a consistent search operation by the user allows the information search support device to automatically determine that the search target of the user has been identified. This produces an effect that information matching an interest of the user can be more accurately searched and presented while not increasing an operation burden on the user and further reducing "oversight" and "omission" of one or more programs interested in by the user.

Furthermore, as the information search support device according to the present embodiment is always calculating the degree of certainty indicating whether or not the search target of the user has been identified, there is another effect of adapting to a dynamic change of the interest of the user since the one or more search-omitted programs can be added even in the case where the interest of the user has been changed during a program search.

It is to be noted that, in Embodiment 1, when an interest of the user is narrowed down to something associated with medical services in Operation No.2 shown in FIG. 9, the user selects Cluster 4 including a representative word "Medical services", and causes a program list included in the selected cluster to be displayed. At this time, the program list to which the one or more search-omitted programs extracted by the search-omitted information extraction unit 109 have been added is displayed. This way, the user selects a desired program related to the medical services from the program list. However, the present invention is not limited to Embodiment 1. For example, when the interest of the user is narrowed down to something associated with the medical services, the user may extract one or more programs including the word "Medical services" from Cluster 4 and the non-selected clusters by selecting the word "Medical services" from among representative words displayed in Cluster 4. In the present invention, in comparison with a case where the present processing is not performed, representative words further matching the interest of the user are displayed since the search-omitted information estimated as the search interest of the user is extracted and added to a cluster. Therefore, there is still another effect of performing search consistent with the interest of the user even when a keyword search is performed using representative words.

Embodiment 2

In Embodiment 1, it is determined whether or not the search target of the user has been identified, based on the information (the DF values of the representative words of the selected cluster) on how much the selected cluster has become the narrowed down region, and, when it is determined that the search target has been identified, the addition of the one or more search-omitted programs matching the interest of the user is performed by adding the one or more search-omitted programs extracted for each cluster selection to one or more candidate programs on which next clustering is executed or which are to be displayed in a list.

Hereinafter, Embodiment 2 will describe a method in which one or more search-omitted programs are not extracted each time but extracted only when a degree of certainty of a search target of a user becomes equal to or higher than a threshold. This means that it is determined whether or not the interest of the user has been identified, and the one or more search-omitted programs are extracted only when it is determined that the interest has been identified. Further, Embodiment 2 will describe a method for generating a vector by assigning weight to each of words so that one or more programs other than the search target of the user are not included in an extraction result of a search-omitted information extraction method.

Figure 15:
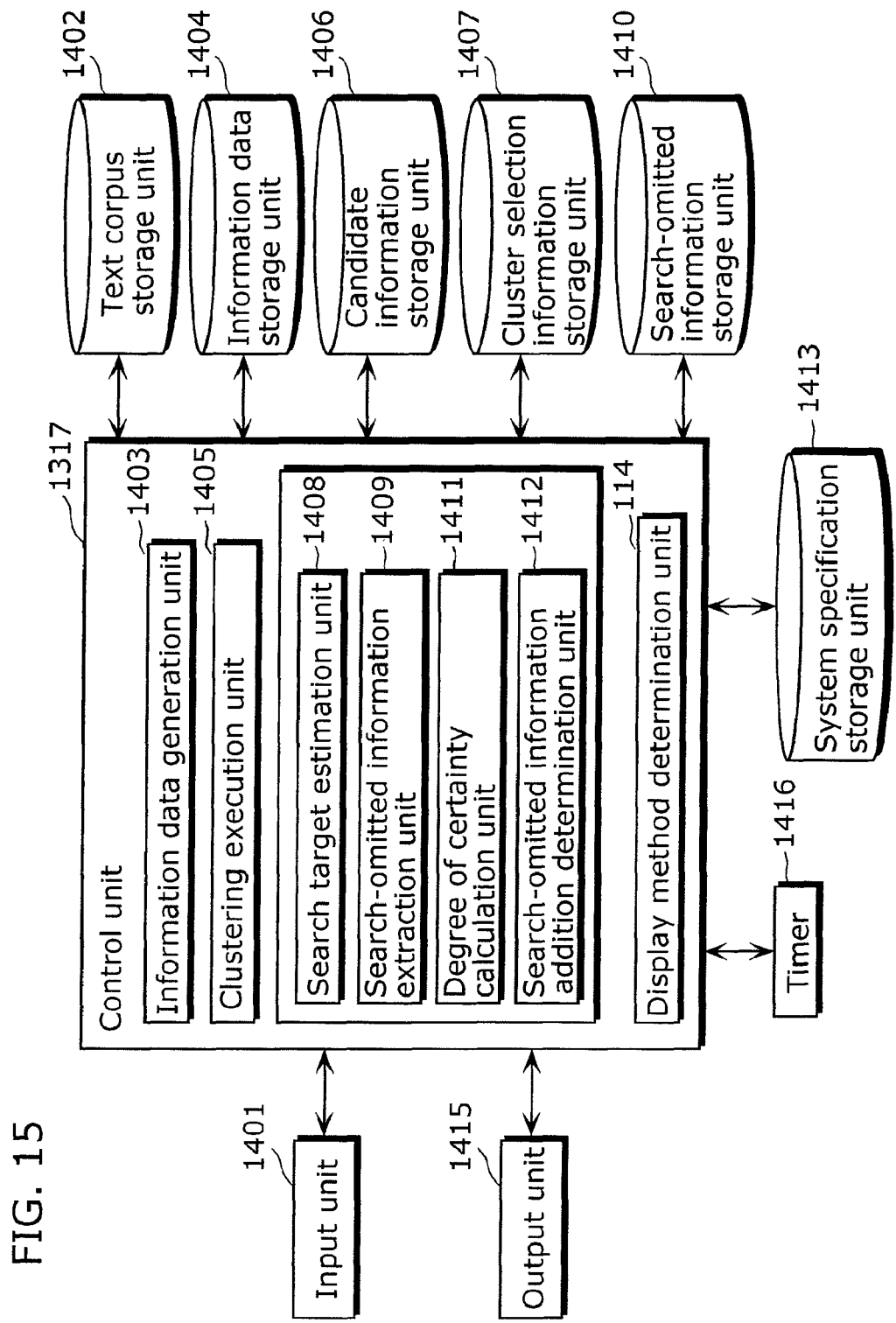
FIG. 15 is a block diagram showing a structure of an information search support device according to Embodiment 2.
Figure 16:
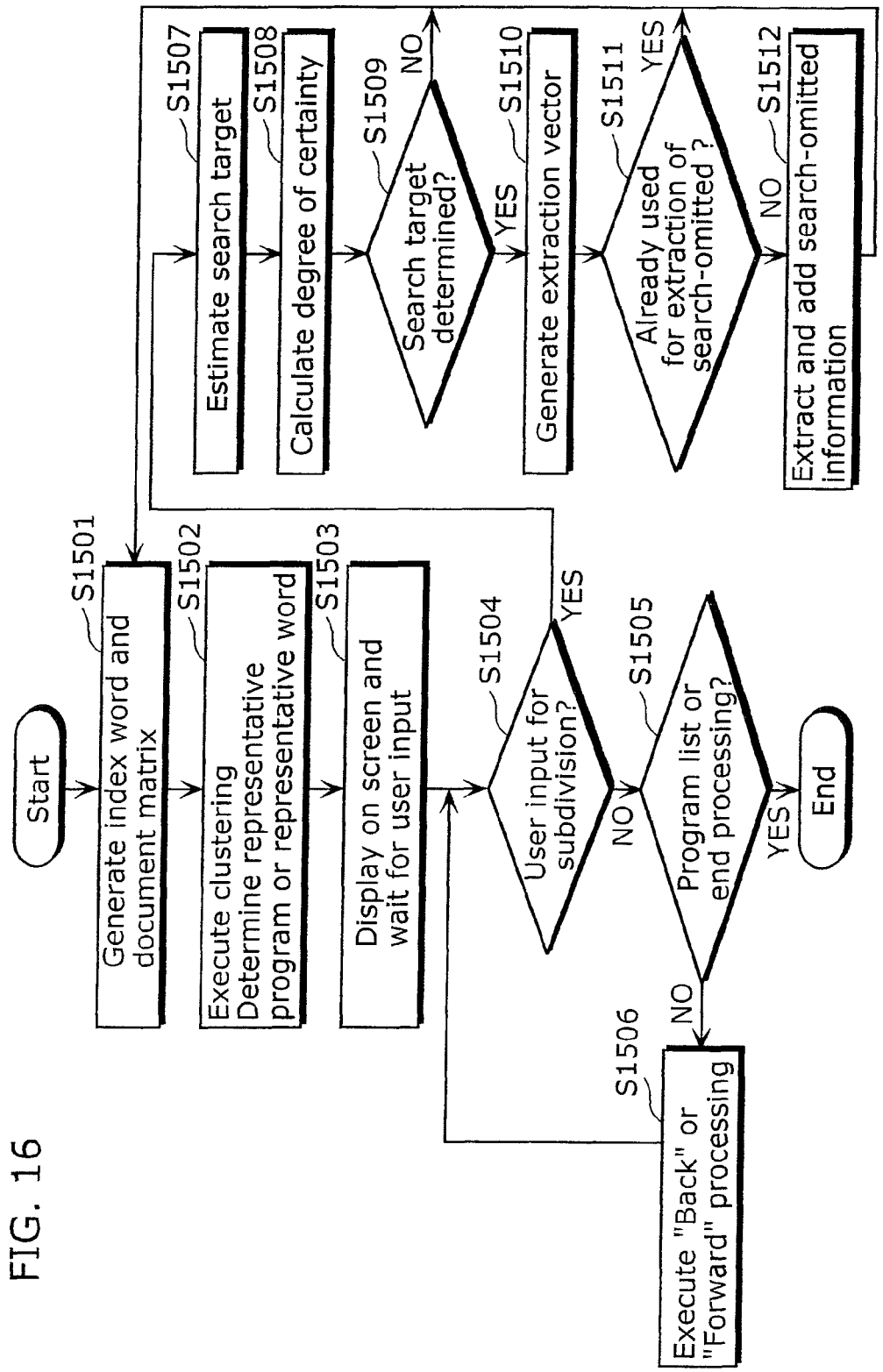
FIG. 16 is a flow chart showing basic operations of the information search support device according to Embodiment 2.

FIG. 15 is a block diagram showing a structure of an information search support device according to Embodiment 2, and FIG. 16 is a flow chart showing basic operations of the information search support device according to Embodiment 2. Here, the search-omitted information addition determination unit 112 shown in FIG. 1 and steps S207 to S211 shown in FIG. 3 are merely replaced, for the information search support device according to Embodiment 2, with a search-omitted information extraction determination unit 1412 shown in FIG. 15 and steps S1507 to S1512 shown in FIG. 16, respectively. The other components and steps are the same as in Embodiment 1. Thus, Embodiment 2 will mainly describe differences from Embodiment 1.

Hereinafter, as with Embodiment 1, processing for extraction and addition of search-omitted information that is performed from step S1507 to step S1512 will be described using an example of the specific cluster selection history shown in FIG. 9. Here, FIG. 9 shows a portion of information included in the cluster selection history shown in FIG. 7, the portion of the information being associated with a specific sequence.

In step S1507, a search target estimation unit 1408 estimates a search target of a user based on cluster selection of the user stored in a cluster selection information storage unit 1407. Here, as with Embodiment 1, one or more words related to a cluster selected by the user are extracted, and the search target of the user is estimated using the one or more words.

In step S1508, a degree of certainty calculation unit 1411 determines a degree of certainty of the search target of the user that has been estimated in step S1507, based on the information stored in the cluster selection information storage unit 1407. The degree of certainty is calculated in the same manner as Embodiment 1.

In step S1509, a search-omitted information extraction determination unit 1412 determines whether or not search-omitted information is extracted, based on the degree of certainty calculated in step S1508. More specifically, it is determined that the search target of the user has been identified when the degree of certainty exceeds a threshold, and then it is determined that the search-omitted information is to be extracted. For instance, assuming that the threshold is 5.0, when a system is in Operation No.1 state as shown in FIG. 10(a), since a degree of certainty is 1.8 and is a value smaller than the threshold, it is determined that the search target of the user has not been identified, and search-omitted information is not extracted. The flow is then advanced to step S1501. On the other hand, when the system is in Operation No.2 state as shown in FIG. 10(b), since the degree of certainty is 9.6 that is a value larger than the threshold 5.0, the search-omitted information extraction determination unit 1412 determines that the search target of the user has been identified. The flow is then advanced to step S1510.

In step S1510, a search-omitted information extraction unit 1409 generates a vector (hereinafter, simply referred to as extraction vector) to be used for extracting the search-omitted information. An extraction vector of each of one or more representative words of a cluster selected when it is determined that the search target of the user has been identified, that is, one or more representative words obtained by the search target estimation unit 1408, is generated, and the extraction vector is generated by calculating a sum of the one or more vectors. It is to be noted that in the case where representative program names included in a cluster are also displayed, for each cluster, as display information as shown in FIG. 4, an extraction vector may be generated by using a word included in a program name, and the extraction vector may be generated by using a TF value, a DF value, an IDF value and the like of a word having strong relevance to a cluster, among words that are not displayed on the output screen but used for program information included in the cluster.

It is to be noted that, in the example shown in FIG. 4, "words that are not displayed on an output screen but are used for program information included in a cluster" are words included in program titles and program contents of programs other than the 5 displayed representative programs.

The generated extraction vector together with the result of determination in step S1509 is stored in the cluster selection information storage unit 1407. FIG. 17 is a diagram showing an example of data stored in association with the operation sequences shown in FIGS. 9 and 10. Item 1601 shows Operation No., item 1602 the result of search-omitted information extraction determination performed in step S1509 by the search-omitted information extraction determination unit 1412, item 1603 a generated extraction vector, and item 1604 information regarding a distance between an extraction vector generated before and an extraction vector and on when (at which Operation No.) the former extraction vector is generated. As shown in FIG. 17, when Operation No.1 is shown in item 1601, since a degree of certainty (1.8) is a value smaller than a threshold (5.0), none of items 1602 to 1604 shows data. On the other hand, when Operation No.2 is shown, since the degree of certainty (9.6) is higher than the threshold (5.0), a result of search-omitted information extraction determination, "Degree of certainty is above threshold", is described in item 1602, and an extraction vector "( . . . )" is described in item 1603. Moreover, for instance, in the case where subdivision is performed in Operation No.2 state, a result of search-omitted information extraction determination, "Degree of certainty is above threshold", is described in item 1602 in Operation No.3, and an extraction vector "( . . . )" is described in item 1603. Further, Operation No. of a past extraction vector "2" and a distance "0.7" between the extraction vector "( . . . )" of Operation No.2 shown in item 1604 and the extraction vector "( . . . )" of Operation No.3 shown in item 1603 are described as a distance from the past extraction vector in item 1604.

It is to be noted that, here, when generating the extraction vector, the search-omitted information extraction unit 1409 assigns weight to each word and generates the vector so that a result of extracting search-omitted information does not include one or more programs other than the identified search target of the user. The search-omitted information extraction unit 1409 is an example of the "search-omitted information extraction unit configured to determine a degree of importance for a representative word to be used for extracting the search-omitted information, to determine, with the degree of importance, that the representative word becomes more important as the number of documents in which the representative word appears becomes smaller, and to generate an extraction vector from the representative word that is weighted according to the determined degree of importance, the documents indicating contents of the search-target information". As the determination that the search interest of the user has been identified is included in the degree of importance of the word, a multiplicative inverse of a DF value of a representative word in a cluster is used so that a smaller value is given to a degree of importance of a word as the word is associated with the larger number of programs. For example, when the system extracts one or more search-omitted programs in Operation No.2 state shown in FIG. 10(b), a degree of importance of the word "Tomorrow" is $\alpha \times (1 \div 9)$, and a degree of importance of the word "Region" is $\alpha \times (1 \div 16)$ ($\alpha$ is an invariable). Since this method reduces influences of a word associated with the larger number of programs, it is possible to prevent programs obtained through the extraction result from being excessive in number.

Further, not only the representative word of the selected cluster but also a representative word of a cluster that has not been selected (hereinafter, referred to as a representative word of a non-selected cluster) may be used. More specifically, the representative word of the non-selected cluster is also vectorized, and an extraction vector is generated by adding the representative word of the non-selected cluster and the representative word of the selected cluster. However, as the representative word of the non-selected cluster is a word that the user was not interested in, a degree of importance thereof is negative. Here, the negative degree of importance, which is inversely proportional to a DF value, is set to the representative word of the non-selected cluster so that a negative value of a word is larger as the word has a smaller DF value indicating that a specific program has been identified. In addition, representative words of all the clusters that have not been selected since a start of information search may be used, or representative words of clusters that have not been selected from the present up to a predetermined number of times the information search has been performed may be used.

Furthermore, a degree of importance may be determined depending on the types of representative words. The types of representative words are the types of words tagged in EPG and the like, for example "character name" and "genre". In the case of "genre", it is further classified into "large genre", "medium genre", "small genre", and so on. With the same concept as the case where the DF value is used, the degree of importance is set to increase in order of "large genre", "medium genre", and "small genre" as the search target of the user has been identified. On the other hand, because "personal or character name" has a property that a program content can be clearly imagined to an extent regardless of a DF value, a large value is set for the degree of importance regardless of the DF value. For instance, in a degree of importance calculation method in which the DF value is used, a value equivalent to the highest value held by a representative word among representative words is assigned to "character name". With a concept opposite to the concept for the above representative words of the selected cluster, a negative value increases in order of "large genre", "medium genre", and "small genre" for the representative words of the non-selected clusters, and the smallest value (negative value is large) held by a representative word among the representative words of the non-selected clusters is assigned to "personal or character name".

In step S1511, the search-omitted information extraction unit 1409 calculates distances between each of extraction vectors generated before and an extraction vector generated in current Operation No., and stores the calculated distances in the cluster selection information storage unit 1407 (item 1604 shown in FIG. 17). In the case where a distance between the both vectors is equal to or greater than a threshold, it is determined that the extraction of the search-omitted programs has been already performed with the set word. The flow is then advanced to step S1501, and the extraction of the search-omitted programs is not performed. On the other hand, in the case where the distance between the vectors is less than the threshold in the determination of step S1511, the flow is advanced to step S1512, and the extraction of the search-omitted programs is performed. For example, in the case where a threshold of a distance between vectors is 0.5 in the determination of step S1511, since a distance between the extraction vector of Operation No.2 and the extraction vector of Operation No.3 shown in FIG. 17 is 0.7 and is thus greater than the threshold, it is determined that the extraction vectors of Operation No.2 and Operation No.3 are close to each other, and extraction of search-omitted programs is not performed in Operation No.3. It is to be noted that in the case where there are vectors that have been generated before and are used for extracting search-omitted programs, a difference between a vector having the closest distance, among the vectors, and the extraction vector is used for the determination. It is to be noted that in the case where the distance between the vectors is supposedly less than 0.5, since it is determined that the extraction vectors of Operation No.2 and Operation No.3 are far from each other, the extraction of the search-omitted programs is performed in Operation No.3. As stated above, since it is determined whether or not the extraction of the search-omitted programs is performed for each operation and the extraction of the search-omitted programs is performed, in the case where the search target is changed between Operation No.2 and Operation No.3, it becomes possible to extract search-omitted programs, and in the case where the search target remains the same between Operation No.2 and Operation No.3, it becomes possible not to extract search-omitted programs even when the DF value or the number of programs is less than a predetermined number. Through the aforementioned operations, the extraction of the search-omitted programs that corresponds to a case where the search target is dynamically changed becomes possible.

Here, since a distance of vectors is defined, for example, by inner product of the vectors, the larger the distance, the closer the distance, that is, both vectors are similar to each other.

In step S1512, the search-omitted information extraction unit 1409 first extracts the search-omitted programs from non-selected program regions using the generated extraction vector, and stores the result of the extraction in the search-omitted information storage unit 1410. More specifically, vectors each corresponding to one of programs of non-selected clusters are generated from an index word and document matrix, distances between each vector and the extraction vector are calculated, and programs having a distance equal to or greater than a threshold are extracted as programs related to the identified search target of the user. It is to be noted that, as described in Embodiment 1, the number of programs to be extracted may be determined according to the number of the programs in the currently selected cluster or the number of all the current target programs, instead of determining it with the threshold.

Further, distances between vectors each corresponding to one of the programs in the currently selected cluster and an extraction vector are calculated and compared with distances between vectors each corresponding to one of programs extracted through extraction of search-omitted programs and the extraction vector. In the case where the programs obtained through the extraction of the search-omitted programs have a larger distance to the extraction vector, the currently selected programs may be replaced with programs within a scope of the number of the currently selected programs. For this reason, it becomes possible to narrow down programs suitable to the search target of the user whose search target has been identified more clearly.

Next, a control unit 1317 adds the programs included in the selected cluster stored in the candidate information storage unit 1406 in step S1504 and the search-omitted programs stored in the search-omitted information storage unit 1410 in the present step. The flow is then advanced to step S1501, which leads to the next clustering.

As described above, through the aforementioned operations, the information search support device according to Embodiment 2 can automatically determine whether or not the search target of the user has been identified from the selection information (cluster selection history) of the user, and automatically extract the programs that are related to the identified or changed search target but are thought to have been omitted from the past selection, at a point of time when it is estimated that the search target has been identified or changed. For this reason, it becomes possible to add, to the currently selected search target, the programs thought to have been omitted from the past selection. Thus, it becomes possible to present the user more programs corresponding to the search target of the user. In addition, the extraction is performed after the degree of importance is assigned to each word to be used for extracting the search-omitted programs, there is an effect of reducing the extraction of programs other than the identified search target of the user as the search-omitted information.

Embodiment 3

In Embodiments 1 and 2, it is determined whether or not the search target of the user has been identified based on the degree of certainty defined by using the information (DF value) on how much the selected cluster has become the narrowed-down region, and the extraction of the search-omitted programs is performed. However, although, in this case, when the selected cluster is rapidly narrowed down, it can be easily determined that the search target of the user has become identified, when it is gradually narrowed down, there is a problem that the determination is not easy.

Thus, in Embodiment 3, it is determined whether or not the search target of the user has been identified, by using a feature that the user comes to select a cluster including consistent words when a narrowed-down region of the user is identified. More specifically, the following will describe a method for quantifying a degree of certainty of the search target of the user based on information on how consistent representative words selected by the user are and for determining whether or not the search target has been identified based on the quantified value. In the method, as the degree of certainty of the search target of the user is determined using the consistency of the selected representative words, it becomes possible to calculate the degree of certainty of the search target of the user without depending on DF values of representative words in a cluster and the number of target programs.

Embodiment 3 differs from above-mentioned Embodiment 2 in the data generated in step S1501, the data necessary for determining whether or not the search target has been determined in step S1509, the method for calculating the degree of certainty in step S1508, the method for generating the extraction vector to be used for extracting the search-omitted programs in step S1510, and the method for extracting the search-omitted programs in step S1512, and the other elements of Embodiment 3 are the same as those of Embodiment 2. Accordingly, the differences will be mainly described in the present embodiment.

It is to be noted that since a method for calculating a degree of certainty and a method for generating a vector for extracting search-omitted programs, which will be described in Embodiment 3, are independent of the calculation method and the extraction vector generation method described in above-mentioned Embodiments 1 and 2, the former methods may be used in combination with the latter methods.

In step S1501 shown in FIG. 16, in addition to generating an index word and document matrix, first, an information data generation unit 1403 performs singular value decomposition on the index word and document matrix, and generates a dimensionally compressed matrix. Next, an index word and a document are respectively expressed with a dimensionally-compressed vector by using the dimensionally-compressed matrix, and the dimensionally-compressed vector is stored in an information data storage unit 1404.

It becomes possible to calculate a semantic distance between index words by using the index word vector and the document vector generated based on the aforementioned compressed matrix, and to search one or more documents from an index word based on a degree of semantic similarity. These techniques are called Latent Semantic Analysis (LSA) and Latent Semantic Indexing (LSI) (Non-patent Reference 2: Journal of Japanese Society for Fuzzy Theory and Intelligent Informatics Vol. 17, No. 1, p. 76 (2005); and Non-patent Reference 3: Joho Kensaku Algorithm (Information Retrieval Algorithm) (Kyoritsu Shuppan Co., Ltd) p. 65 (2002)). The method allows quantification of a degree of semantic similarity between words or a word and a document as well as an improvement of extraction speed.

The following will describe a method for determining extraction of search-omitted programs and for extracting the search-omitted programs, using the cluster selection history shown in FIG. 18 as an example. It is to be noted that, as with FIG. 9 described in aforementioned Embodiment 1, FIG. 18 is a diagram showing a portion of information on the selection information shown in FIG. 7, the portion of the information being included in a cluster selection history and being stored in a cluster selection information storage unit 1407 in association with a specific operation sequence.

The method for determining the extraction of the search-omitted programs and for extracting the search-omitted programs will be described with reference to the flow chart shown in FIG. 16.

In step S1507, first, the search target estimation unit 1408 obtains a condition for estimating the search target of the user based on cluster selection of the user stored in the cluster selection information storage unit 1407. Here, as with aforementioned Embodiments 1 and 2, the search target estimation unit 1408 extracts representative words of a cluster selected by the user, and estimates that one or more programs extracted based on the extracted representative words are the search target of the user. Next, the search-omitted information extraction unit 1409 extracts a vector of each representative word of the selected cluster, generates an extraction vector of the selected cluster by summing the vectors, and stores the extraction vector in the cluster selection information storage unit 1407.

In step S1508, the degree of certainty calculation unit 1411 is an example of the "degree of certainty calculation unit configured to calculate a degree of semantic similarity between a representative word representing a previously selected cluster and a representative word representing a currently selected cluster, and to calculate the degree of certainty according to a mathematical expression that the degree of certainty becomes higher as the calculated degree of semantic similarity becomes higher", and calculates a distance between a representative word vector of a previously selected cluster and a representative word vector of a currently selected cluster. The result of the calculation is stored in the cluster selection information storage unit 1407, with the distance being the degree of certainty of the search target of the user.

In step S1509, it is determined whether or not the search target of the user has been identified, that is, whether or not extraction of search-omitted programs is performed, based on the degree of certainty calculated in step S1508. More specifically, in the case where the degree of certainty is equal to or higher than a threshold, the extraction of the search-omitted programs is performed.

FIG. 19 is a diagram showing detailed contents of each of selected clusters corresponding to the cluster selection history shown in FIG. 18. Stated differently, FIG. 19 shows a data example where distances between the representative word vectors of the selected cluster, which are generated in step S1507, and the representative word vectors of the previously selected cluster, which are calculated in the present step, and the extraction vector generated in step S1510 are stored in the cluster selection information storage unit 1407, in association with the sequence of the cluster selection history shown in FIG. 18. Here, item 1801 shows a representative word vector of the selected cluster, which is generated in step S1507, item 1802 a distance between the representative word vector of the just previously selected cluster and the representative word vector of the currently selected cluster, and item 1803 an extraction vector for extracting the search-omitted programs, which is generated in step S1510.

From a table shown in FIG. 19(*b*), for example, it is obvious that a distance between a representative word vector of Cluster 1 selected by a system in Operation No.1 state shown in FIG. 18 and a representative word vector of Cluster 2 selected by the system in Operation No.2 sate shown in FIG. 18 is 0.2.

Now, if the threshold used for determining the extraction of the search-omitted programs is 0.5, since there are values exceeding the threshold both at the time of subdivision execution in Operation No.2 shown in FIG. 19 and at the time of subdivision execution in Operation No.3 shown in FIG. 19, the flow is advanced to step S1510.

It is to be noted that, in the present embodiment, when the user comes to select a cluster including consistent representative words, it is determined that what the user narrows down has been identified, and the extraction of the search-omitted programs is performed. The following will describe a specific example of the above. Whether or not the cluster including the consistent words is selected is determined by calculating, as a degree of certainty, a degree of similarity between representative words of a previously selected cluster and representative words currently selected. As it is only necessary to define that the degree of certainty becomes higher as a similar word is selected, in addition to defining the distance between the representative word vectors of the aforementioned clusters, as a definition of the degree of certainty, the number or a ratio of the same representative words included in the representative words of the previously selected cluster and the currently selected cluster may be used, or a distance between each of words is calculated using word vectors of the index words, and the number or a ratio of words having a distance equal to or greater than a certain value, among the words, may be used.

In step S1510, the search-omitted information extraction unit 1409 generates, for each of selected clusters, a vector (hereinafter, simply referred to as extraction vector) to be used for extracting the search-omitted programs. However, the extraction vector is generated here only for a selected cluster that is determined to be consistent with a previously selected cluster in step S1507, and although, for instance, Cluster 2 and Cluster 3 are selected in Operation No.2 state shown in FIG. 19, since only Cluster 2 has a distance from the representative vector of the previously selected cluster, an extraction vector is generated only for Cluster 2 in Operation No.2 in state shown in FIG. 19, the distance being equal to or greater than the threshold 0.5. Likewise, an extraction vector is generated for each of Cluster 2 and Cluster 4 in Operation No.3 state shown in FIG. 19.

As with the representative word vector of the selected cluster, although the extraction vector is generated based on the representative words of the selected cluster, when generating the extraction vector, a weight indicating a degree of importance is assigned to each word and the extraction vector is generated so that the result of the extraction of the search-omitted programs does not include programs other than the identified search target of the user.

The degree of importance is defined to be higher for a consistent word. This is made possible by assigning a high degree of importance to a word semantically close to the representative words of the previously selected cluster, which are determined to be consistent. The search-omitted information extraction unit 109 is an example of the "search-omitted information extraction unit is configured to calculate a degree of semantic similarity between a representative word representing a previously selected cluster and a representative word representing a currently selected cluster, to determine that consistency of the representative words of the selected clusters becomes stronger as the calculated degree of semantic similarity becomes higher, to determine, for a representative word to be used for extracting the search-omitted information, a degree of importance so that the degree of importance of the representative word becomes higher as the consistency of the representative words becomes stronger, and to generate an extraction vector from the representative word that is weighted according to the determined degree of importance." For example, each of distances between the representative word vectors of the previously selected cluster, which are determined to be consistent, and each of representative words to be used for extracting an extraction vector may be calculated, and a higher degree of importance may be assigned to a word having a closer distance, and each distance between the representative words of the previously selected cluster and each representative word to be used for extracting the extraction vector may be calculated, and the degree of importance may be increased for a word having a larger maximum value.

It is to be noted that in the case where there is a selected cluster having a distance between representative vectors exceeding a threshold with respect to previously selected clusters, a degree of importance of a word may be determined for a previously selected cluster having the closest distance, and degrees of importance may be calculated for all the clusters with the aforementioned method, and the results of the calculation may be multiplied with the distance between the representative vectors to obtain a new degree of importance.

In step S1511, the search-omitted information extraction unit 1409 calculates distances between each of extraction vectors generated before and an extraction vector generated with a current operation, and stores the calculated distances in the cluster selection information storage unit 1407. FIG. 20 is a diagram showing a relationship between an extraction vector generated through past clustering and an extraction vector generated through clustering subsequent to the past clustering. The distances between the extraction vectors calculated in step S1511 are recorded in item 1905 shown in FIG. 20. In the case where a distance between the both vectors is equal to or greater than a threshold, it is determined that extraction of search-omitted programs has been already performed with a word set, the flow is advanced to step S1501, and the extraction of the search-omitted programs is not performed. On the other hand, in the case where the distance between the both vectors is smaller than the threshold, the flow is advanced to step S1512, and the extraction of the search-omitted programs is performed. For instance, in the case where a threshold is 0.5, since a distance between an extraction vector of Cluster 2 and an extraction vector of Cluster 2 in Operation No.2, which is a previous extraction vector, is 0.7 and thus is greater than the threshold, it is determined that extraction has been performed, and extraction of search-omitted programs is not performed. On the other hand, in the same situation, since a distance between an extraction vector of Cluster 4 and a previous extraction vector is 0.0 and thus is less than the threshold, it is determined that the extraction has not been performed, and the extraction of the search-omitted programs is performed using the vector. In the case where there are vectors that have been generated before and are used for extracting the search-omitted programs, a difference between a vector having the closest distance, among the vectors, and the extraction vector is used for determining whether or not the extraction has been performed.

In step S1512, first, the search-omitted information extraction determination unit 1412 performs search-omitted program extraction on programs in respective program regions belonging to a corresponding one of non-selected clusters, using the generated extraction vector, and stores the result of the extraction in the search-omitted information storage unit 1410. More specifically, extraction of what is omitted is performed by using the extraction vector generated using the representative word of Cluster 2 in Operation No.2 shown in FIG. 20, search-omitted program extraction is performed by using the extraction vector generated using the representative word of Cluster 4 in Operation No.3 shown in FIG. 20, based on programs belonging to non-selected clusters, and the results of the extraction are stored.

Here, in the search-omitted program extraction in Operation No.3 shown in FIG. 20, although there is almost no change in the number of representative words and programs between Cluster 2 in Operation No.2 shown in FIG. 20 and Cluster 4 in Operation No.3 shown in FIG. 20, with the aforementioned method, it is possible to determine that the interest of the user has been determined.

Next, the control unit 1317 adds the programs included in the selected cluster stored in the candidate information storage unit 1406 in step S1504 and the search-omitted programs stored in the search-omitted information storage unit 1410 in the present step. The flow is then advanced to step S1501, which leads to the next clustering.

As described above, at the time of estimating that the search target has been identified or changed, it is possible to automatically extract programs related to the identified or changed search target as well as programs thought to have been omitted from the past selection, and add the programs to the current search target, by defining the degree of certainty that is a criterion for determining, based on whether or not the representative words of the clusters selected by the user are consistent, whether or not the search target has been determined. For this reason, the operation burden on the user is not increased, and further the "oversight" and the "omission" of the programs interested in by the user can be reduced.

Further, as the execution of the search-omitted program extraction is determined by using the consistency of the words, despite the search target has been identified, even in the case where the number of programs in the selected cluster or the DF value of the representative word gradually changes, it becomes possible to accurately determine the identification of the search target.

Moreover, as the degree of importance of the word used at the time of the extraction is determined by using the consistency of the words, it becomes possible to accurately assign the degree of importance to the word the user thinks important in narrowing down, and to perform the accurate search-omitted program extraction.

With the processing which is realized with the structures described in Embodiments 1 to 3 and in which the information interesting to the user is automatically gathered and added to the selected cluster, since the result of the processing can be reflected without changing the system operation procedure, the user can obtain the interesting information with the consistent operation procedure. As stated above, in comparison with an interface with which the user oneself performs keyword search, after the interest of the user is identified, not only does searching with the same operation cause no burden of generating a search keyword or a combination of search keywords on the user, but also produces an effect that it is not necessary to change search thinking.

Furthermore, in the present method, since a region of the interest of the user is automatically estimated from the information on the selected cluster, it becomes possible to automatically gather relevant information for the interest of the user, which cannot be found with the user-led search such as the keyword search and which the user oneself is not aware of.

It is to be noted that although Embodiments 1 to 3 have described the narrowing-down operation for the program search as the specific example of the information search support, the present technique can be applied to a system if the system performs automatic classification by clustering and narrowing down through the cluster selection by the user based on the representative words. For example, the present technique can be applied to supporting search for information such as newspaper articles, a description of functions in a manual, and merchandise information on web sites.

INDUSTRIAL APPLICABILITY

The present invention can be applied to an information search device which supports, when a search target of a user has not been identified, finding information interesting to the user mainly from contents to which a lot of documents and metadata are assigned, and the applicability of the present invention as a search support technique and GUI for a search device which mainly searches program contents, music contents, articles, merchandise information, and device functions is significantly high.

The invention claimed is:

1. An information search support device which supports information search by a user, said information search support device comprising:
   a display unit configured to perform a first clustering on search-target information, and to display a plurality of clusters and information indicating a feature of each of the displayed clusters;
   a clustering unit configured to perform a second clustering on a search target of the user, the search target of the user including information included in a cluster selected by the user from among the displayed clusters;
   a processor;
   a cluster selection history information accumulation unit configured to accumulate, using said processor, cluster selection history information as content information of each of the displayed clusters at a time of performing the second clustering, the cluster selection history information indicating one of the following: a number of pieces of information included in the cluster selected by the user; a number of clusters selected from among the displayed clusters, and a number of documents including a representative word representing the cluster selected by the user among documents indicating contents of the search-target information;
   a degree of certainty calculation unit configured to calculate a degree of certainty indicating a degree of clarity for the search target of the user, based on the cluster selection history information accumulated in said cluster selection history information accumulation unit;
   a search target estimation unit configured to obtain, from content information of the cluster selected by the user, a condition for estimating the search target of the user;
   a search-omitted information extraction unit configured to extract, from a cluster that is not selected by the user from among the displayed clusters, search-omitted information that is (i) information included in the cluster that is not selected by the user and (ii) information belonging to a set of information estimated from the condition obtained by said search target estimation unit; and
   a search-omitted information addition unit configured to (i) judge whether or not the degree of certainty calculated by said degree of certainty calculation unit is equal to or higher than a predetermined threshold, and (ii) add, to the cluster selected by the user, the search-omitted information extracted by said search-omitted information extraction unit, in a case where the judgment shows that the degree of certainty calculated by said degree of certainty calculation unit is equal to or higher than the predetermined threshold,
   wherein said clustering unit is configured to perform a third clustering on the search target of the user after said search-omitted information addition unit adds the search-omitted information to the cluster selected by the user.

2. The information search support device according to claim 1,
   wherein said search target estimation unit is configured to obtain, as the condition for estimating the search target of the user, a representative word representing the cluster selected by the user, and
   wherein said search-omitted information extraction unit is configured to generate an extraction vector for extracting the search-omitted information from the information included in the cluster that is not selected by the user, using a vector obtained from the representative word obtained by said search target estimation unit.

3. The information search support device according to claim 1,
   wherein said cluster selection history information accumulation unit is configured to accumulate, as the content information of each of the displayed clusters, one of the following: the number of pieces of information included in the cluster selected by the user; the number of clusters selected from among the displayed clusters; and the number of documents including a representative word representing the cluster selected by the user among documents indicating contents of the search-target information, and
   wherein said degree of certainty calculation unit is configured to calculate, for certain content information accumulated in said cluster selection history information accumulation unit, the degree of certainty according to a rule that the degree of certainty becomes higher as the number of pieces of content information becomes smaller.

4. The information search support device according to claim 1,
   wherein said degree of certainty calculation unit is configured to calculate a degree of semantic similarity between a representative word representing a previously selected cluster and a representative word representing a currently selected cluster, and to calculate the degree of certainty according to a mathematical expression that the degree of certainty becomes higher as the calculated degree of semantic similarity becomes higher.

5. The information search support device according to claim 1,
wherein said search-omitted information extraction unit is configured to (i) determine a degree of importance for a representative word to be used for extracting the search-omitted information, (ii) determine, with the degree of importance, that the representative word becomes more important as the number of documents in which the representative word appears becomes smaller, the documents indicating contents of the search-target information, and (iii) generate an extraction vector from the representative word after the representative word is weighted according to the determined degree of importance.

6. The information search support device according to claim 1,
wherein said search-omitted information extraction unit is configured to (i) calculate a degree of semantic similarity between a representative word representing a previously selected cluster and a representative word representing a currently selected cluster, (ii) determine that a consistency between (a) the representative word of the previously selected cluster and (b) the representative word of the currently selected cluster becomes stronger as the calculated degree of semantic similarity becomes higher, (iii) determine, for a representative word to be used for extracting the search-omitted information, a degree of importance so that the degree of importance of the representative word to be used for extracting the search-omitted information becomes higher as the consistency between (a) the representative word of the previously selected cluster and (b) the representative word of the currently selected cluster becomes stronger, and (iv) generate an extraction vector from the representative word to be used for extracting the search-omitted information after the representative word to be used for extracting the search-omitted information is weighted according to the determined degree of importance.

7. An information search support method for supporting information search by a user, wherein said information search support method is performed using a processor, said information search support method comprising:
(i) performing a first clustering on search-target information, and displaying a plurality of clusters and information indicating a feature of each of the displayed clusters, said performing the first clustering and displaying being performed by a display unit;
(ii) performing a second clustering on a search target of the user, the search target of the user including information included in a cluster selected by the user from among the displayed clusters, said performing the second clustering being performed by a clustering unit;
(iii) accumulating, using the processor, cluster selection history information as content information of each of the displayed clusters at a time of performing the second clustering, the cluster selection history information indicating one of the following: a number of pieces of information included in the cluster selected by the user; a number of clusters selected from among the displayed clusters, and a number of documents including a representative word representing the cluster selected by the user among documents indicating contents of the search-target information, said accumulating being performed by a cluster selection history information accumulation unit;
(iv) calculating a degree of certainty indicating a degree of clarity for the search target of the user, based on the cluster selection history information accumulated in said accumulating;
(v) obtaining, from content information of the cluster selected by the user, a condition for estimating the search target of the user;
(vi) extracting, from a cluster that is not selected by the user from among the displayed clusters, search-omitted information that is (a) information included in the cluster that is not selected by the user and (b) information belonging to a set of information estimated from the condition obtained in said obtaining;
(vii) judging whether or not the degree of certainty calculated in said calculating is equal to or higher than a predetermined threshold;
(viii) adding, to the cluster selected by the user, the search-omitted information extracted in said extracting, in a case where the judgment shows that the degree of certainty is equal to or higher than the predetermined threshold; and
(ix) performing a third clustering on the search target of the user after said adding adds the search-omitted information to the cluster selected by the user.

8. A non-transitory computer-readable recording medium for use in a computer, the recording medium having a computer program recorded thereon for causing the computer to execute an information search support method, the information search support method comprising:
performing a first clustering on search-target information, and displaying a plurality of clusters and information indicating a feature of each of the displayed clusters, said performing the first clustering and displaying being performed by a display unit;
performing a second clustering on a search target of a user, the search target of the user including information included in a cluster selected by the user from among the displayed clusters, said performing the second clustering being performed by a clustering unit;
accumulating cluster selection history information as content information of each of the displayed clusters at a time of performing the second clustering, the cluster selection history information indicating one of the following: a number of pieces of information included in the cluster selected by the user; a number of clusters selected from among the displayed clusters, and a number of documents including a representative word representing the cluster selected by the user among documents indicating contents of the search-target information, said accumulating being performed by a cluster selection history information accumulation unit;
calculating a degree of certainty indicating a degree of clarity for the search target of the user, based on the cluster selection history information accumulated in said accumulating;
obtaining, from content information of the cluster selected by the user, a condition for estimating the search target of the user;
extracting, from a cluster that is not selected by the user from among the displayed clusters, search-omitted information that is (i) information included in the cluster that is not selected by the user and (ii) information belonging to a set of information estimated from the condition obtained in said obtaining;

judging whether or not the degree of certainty calculated in said calculating is equal to or higher than a predetermined threshold;

adding, to the cluster selected by the user, the search-omitted information extracted in said extracting, in a case where the judgment shows that the degree of certainty is equal to or higher than the predetermined threshold; and performing a third clustering on the search target of the user after said adding adds the search-omitted information to the cluster selected by the user.

9. An information search support device which supports information search by a user, said information search support device comprising:

a display unit configured to perform a first clustering on search-target information, and to display a plurality of clusters and information indicating a feature of each of the displayed clusters;

a clustering unit configured to perform a second clustering on a search target of the user, the search target of the user including information included in a cluster selected by the user from among the displayed clusters;

a processor;

a cluster selection history information accumulation unit configured to accumulate, using said processor, cluster selection history information as content information of each of the displayed clusters at a time of performing the second clustering, the cluster selection history information indicating one of the following: a number of pieces of information included in the cluster selected by the user; a number of clusters selected from among the displayed clusters, and a number of documents including a representative word representing the cluster selected by the user among documents indicating contents of the search-target information;

a degree of certainty calculation unit configured to calculate a degree of certainty indicating a degree of clarity for the search target of the user, based on the cluster selection history information accumulated in said cluster selection history information accumulation unit;

a search target estimation unit configured to obtain, from content information of the cluster selected by the user, a condition for estimating the search target of the user; and a search-omitted information extraction unit configured to extract, from a cluster that is not selected by the user from among the displayed clusters, search-omitted information that is (i) information included in the cluster that is not selected by the user and (ii) information belonging to a set of information estimated from the condition obtained by said search target estimation unit.

10. The information search support method according to claim 7, further comprising:

displaying information indicating a feature of each of one or more clusters on which the third clustering is performed, said displaying being performed by the display unit; and performing a fourth clustering on the search target of the user, the search target of the user including a cluster selected again by the user from among the displayed clusters, said performing the fourth clustering being performed by the clustering unit.

* * * * *